United States Patent
Einhaus et al.

(10) Patent No.: US 11,063,688 B2
(45) Date of Patent: *Jul. 13, 2021

(54) MODULATION ORDER ADAPTATION FOR PARTIAL SUBFRAMES

(71) Applicant: Sun Patent Trust, New York, NY (US)

(72) Inventors: Michael Einhaus, Darmstadt (DE); Jan Ohlhorst, Langen (DE); Alexander Golitschek Edler von Elbwart, Hessen (DE); Prateek Basu Mallick, Hessen (DE); Joachim Loehr, Hessen (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/661,690

(22) Filed: Oct. 23, 2019

(65) Prior Publication Data

US 2020/0059316 A1 Feb. 20, 2020

Related U.S. Application Data

(63) Continuation of application No. 15/752,882, filed as application No. PCT/EP2016/069152 on Aug. 11, 2016, now Pat. No. 10,547,410.

(30) Foreign Application Priority Data

Aug. 14, 2015 (EP) .................................. 15181139.5

(51) Int. Cl.
*H04L 1/00* (2006.01)
*H04L 1/16* (2006.01)
(Continued)

(52) U.S. Cl.
CPC .............. *H04L 1/0003* (2013.01); *H04L 1/00* (2013.01); *H04L 1/0038* (2013.01);
(Continued)

(58) Field of Classification Search
CPC . H04L 27/0006; H04L 5/0053; H04L 1/1671; H04L 1/1819; H04L 1/0038;
(Continued)

(56) References Cited

U.S. PATENT DOCUMENTS

| 9,667,361 B2 | 5/2017 | Nagata et al. |
| 10,306,662 B2 | 5/2019 | Kim et al. |

(Continued)

FOREIGN PATENT DOCUMENTS

| JP | 2017-516420 A | 6/2017 |
| RU | 2 487 496 C2 | 7/2013 |

(Continued)

OTHER PUBLICATIONS

3GPP TS 36.213 V15.0.0 (Dec. 2017).*
(Continued)

*Primary Examiner* — Yemane Mesfin
*Assistant Examiner* — Henry Baron
(74) *Attorney, Agent, or Firm* — Seed IP Law Group LLP

(57) ABSTRACT

The present disclosure relates to transmitting transport blocks in subframes of a predefined length within a wireless communication system. A downlink control information including a resource grant comprising a predetermined modulation and a predetermined transport block size is received (user equipment is the transmitter) or generated (base station is the transmitter). Then transport block including channel coded data to be transmitted in a subframe with the predetermined modulation and the predetermined transport block size is generated. Sensing is performed in the subframes and based thereon, it is determined whether a partial subframe or a complete subframe is available for transmission of the generated transport block. Finally, the transport block is transmitted with a modified modulation different from the predetermined modulation if the partial
(Continued)

rather than complete subframe is available. Correspondingly, at the receiver, the grant is received (user equipment is receiver) or generated (base station is the receiver), the size of the subframe in which the reception is expected is determined and then the transport block is received with a modified modulation if only the partial subframe is available.

20 Claims, 15 Drawing Sheets

(51) Int. Cl.
  *H04L 1/18*    (2006.01)
  *H04L 27/00*   (2006.01)
  *H04L 5/00*    (2006.01)
  *H04W 72/04*  (2009.01)
(52) U.S. Cl.
  CPC .......... *H04L 1/0068* (2013.01); *H04L 1/1671* (2013.01); *H04L 1/1819* (2013.01); *H04L 5/0044* (2013.01); *H04L 5/0046* (2013.01); *H04L 5/0053* (2013.01); *H04L 5/0094* (2013.01); *H04L 5/0096* (2013.01); *H04L 27/0006* (2013.01); *H04L 5/001* (2013.01); *H04L 5/0078* (2013.01); *H04W 72/042* (2013.01)
(58) Field of Classification Search
  CPC ... H04L 5/0046; H04L 5/0094; H04L 5/0096; H04L 1/00; H04L 5/0044; H04L 1/0068; H04L 1/0003
  See application file for complete search history.

(56) References Cited

U.S. PATENT DOCUMENTS

| | | | |
|---|---|---|---|
| 10,326,548 B2 | 6/2019 | Fujishiro et al. | |
| 10,383,113 B2 | 8/2019 | Yi et al. | |
| 10,601,567 B2 | 3/2020 | Marinier et al. | |
| 2011/0255435 A1* | 10/2011 | Niki | H04W 28/18 370/252 |
| 2012/0014347 A1* | 1/2012 | Tanaka | H04W 28/065 370/329 |
| 2013/0016694 A1 | 1/2013 | Nimbalker et al. | |
| 2013/0083753 A1* | 4/2013 | Lee | H04W 72/0453 370/329 |
| 2013/0100906 A1 | 4/2013 | Yano et al. | |
| 2013/0142134 A1 | 6/2013 | Zhu et al. | |
| 2014/0036853 A1 | 2/2014 | Kim et al. | |
| 2014/0126467 A1 | 5/2014 | Lu et al. | |
| 2015/0215920 A1 | 7/2015 | Mochizuki et al. | |
| 2016/0309451 A1* | 10/2016 | Ye | H04W 72/042 |
| 2016/0309467 A1 | 10/2016 | Yerramalli et al. | |
| 2018/0069653 A1 | 3/2018 | Fujishiro et al. | |

FOREIGN PATENT DOCUMENTS

| | | |
|---|---|---|
| RU | 2 528 178 C1 | 9/2014 |
| RU | 2 531 372 C2 | 10/2014 |
| WO | 2014/003616 A1 | 1/2014 |
| WO | 2015/179055 A1 | 11/2015 |
| WO | 2016/185945 A1 | 11/2016 |
| WO | 20160185945 A1 | 11/2016 |

OTHER PUBLICATIONS

3GPP TS 36.211 V8.0.0, "3rd Generation Partnership Project; Technical Specification Group Radio Access Network; Evolved Universal Terrestrial Radio Access (E-UTRA); Physical channels and modulation (Release 8)," Sep. 2007, 50 pages.
3GPP TR 36.889 V13.0.0, "3rd Generation Partnership Project; Technical Specification Group Radio Access Network; Study on Licensed-Assisted Access to Unlicensed Spectrum (Release 13)," Jun. 2015, 286 pages.
3GPP TS 36.211 V15.0.0, "3rd Generation Partnership Project; Technical Specification Group Radio Access Network; Evolved Universal Terrestrial Radio Access (E-UTRA); Physical channels and modulation (Release 15)," Dec. 2017, 219 pages.
3GPP TS 36.212 V12.1.0, "3rd Generation Partnership Project; Technical Specification Group Radio Access Network; Evolved Universal Terrestrial Radio Access (E-UTRA); Multiplexing and channel coding (Release 12)," Jun. 2014, 90 pages.
3GPP TS 36.212 V12.5.0, "3rd Generation Partnership Project; Technical Specification Group Radio Access Network; Evolved Universal Terrestrial Radio Access (E-UTRA); Multiplexing and channel coding (Release 12)," Jun. 2015, 94 pages.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)." Mar. 2015, 94 pages.
3GPP TS 36.213 V15.0.0, "3rd Generation Partnership Project; Technical Specification Group Radio Access Network; Evolved Universal Terrestrial Radio Access (E-UTRA); Physical layer procedures (Release 15)," Dec. 2017, 493 pages.
3GPP TS 36.213 V12.6.0, "3rd Generation Partnership Project; Technical Specification Group Radio Access Network; Evolved Universal Terrestrial Radio Access (E-UTRA); Physical layer procedures (Release 12)," Jun. 2015, 241 pages.
3GPP TR 36.866 V12.0.1, "3rd Generation Partnership Project; Technical Specification Group Radio Access Network; Study on Network-Assisted Interference Cancellation and Suppression (NAIC) for LTE (Release 12)," Mar. 2014, 64 pages.
Communication pursuant to Article 94(3) EPC, dated Oct. 5, 2017, for corresponding European Patent Application No. 15 181 139.5-1875, 7 pages.
Ericsson, "On Support of Multiple DL Data Transmission Starting Points," R1-153133, Agenda Item: 6.2.4.3, Fukuoka, Japan, May 25-29, 2015, 8 pages.
ETSI EN 301 893 V1.8.0, "Broadband Radio Access Networks (BRAN); 5 GHz high performance RLAN; Harmonized EN covering the essential requirements of article 3.2 of the R&TTE Directive," *Harmonized European Standard*, Jan. 2015, 93 pages.
Extended European Search Report, dated Feb. 8, 2016, for corresponding European Patent Application 15181139.5-1851, 12 pages.
International Search Report, dated Sep. 15, 2016, for corresponding International Patent Application No. PCT/EP2016/069152, 3 pages.
Sesia et al., "LTE—The UMTS Long Term Evolution: From Theory to Practice," Ch. 9.3, Wiley, 2011, 22 pages.
Japanese Office Action, dated Aug. 18, 2020, for Japanese Application No. 2018-505675, 14 pages. (with English machine translation).
Ariyaratne, "Link Adaptation Improvements for Long Term Evolution (LTE)," thesis, Master of Science in Electrical Engineering, Blekinge Institute of Technology, Nov. 2009, 73 pages.
Huawei, Hisilicon, "Frame structure for LAA DL and UL transmission operation," R1-152470, Agenda Item: 6.2.4.3, 3GPP TSG RAN WG1 Meeting #81, Fukuoka, Japan, May 25-29, 2015, 5 pages.
Loshakov et al., "Adaptive Control Signal Parameters in LTE Technology with MIMO," UDC 621.396, *Telecommunications Problems* 2(7), pp. 78-90, 2012. (13 pages).
MediaTek Inc., "enB and UE behaviors with respect to partial subframes," R1-152390, Agenda Item: 7.2.4.2, 3GPP TSG RAN WG1 meeting #80bis, Belgrade, Serbia, Apr. 20-24, 2015, 2 pages.
Panasonic, "Indication of PDSCH in partial subframe," R1-151674, Agenda Item: 7.2.4.2, 3GPP TSG RAN WG1 Meeting #80bis, Belgrade, Serbia, Apr. 20-24, 2015, 4 pages.
Samsung, "Discussion on (E)PDCCH/PDSCH transmission in partial subframe for LAA," R1-151626, Agenda Item: 7.2.4.2, 3GPP TSG RAN1 #80bis, Belgrade, Serbia, Apr. 20-24, 2015, 4 pages.
Russian Office Action, dated May 28, 2020, for Russian Application No. 2020103390, 9 pages. (With English machine translation).

(56) References Cited

OTHER PUBLICATIONS

3GPP TS 36.212 V12.1.0, "$3^{rd}$Generation Partnership Project; Technical Specification Group Radio Access Network; Evolved Universal Terrestrial Radio Access (E-UTRA); Multiplexing and channel coding (Release 12)," Jun. 2014, 89 pages.

Extended European Search Report, dated Feb. 22, 2021, for European Application No. 20210947.6-1205, 9 pages.

* cited by examiner

Fig. 7A

| TBS index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| 2 (QPSK) | ▓ | ▓ | ▓ | ▓ | ▓ | ▓ | ▓ | ▓ | ▓ | ▓ | | | | | | | | | | | | | | | | | | | | | | | | |
| 4 (16QAM) | | | | | | | | | | ▓ | ▓ | ▓ | ▓ | ▓ | ▓ | ▓ | | | | | | | | | | | | | | | | | | |
| 6 (64QAM) | | | | | | | | | | | | | | | | ▓ | ▓ | ▓ | ▓ | ▓ | ▓ | ▓ | ▓ | ▓ | ▓ | ▓ | ▓ | | | | | | | |
| 8 (256QAM) | | | | | | | | | | | | | | | | | | | | | | | | | | | | | | | | | | |

Currently (Rel-12) supported combinations of TB index and modulation order

Fig. 7B

| TBS index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|---|---|---|---|---|---|---|---|---|---|---|---|---|---|---|---|---|
| 2 (QPSK) | ▓ | ▓ | ▓ | ▓ | ▓ | ▓ | ▓ | ▓ | ▓ | ▓ | | | | | | | | | | | | | | | | | | | | | | | | |
| 4 (16QAM) | | | | | | | | | | ▓ | ▓ | ▓ | ▓ | ▓ | ▓ | ▓ | | | | | | | | | | | | | | | | | | |
| 6 (64QAM) | | | | | | | | | | | | | | | | ▓ | ▓ | ▓ | ▓ | ▓ | ▓ | ▓ | ▓ | ▓ | ▓ | | | | | | | | | |
| 8 (256QAM) | | | | | | | | | | | | | | | | | | | | | | | | | ▓ | ▓ | ▓ | ▓ | ▓ | ▓ | ▓ | ▓ | ▓ | ▓ |

Currently (Rel-12) supported combinations of TB index and modulation order

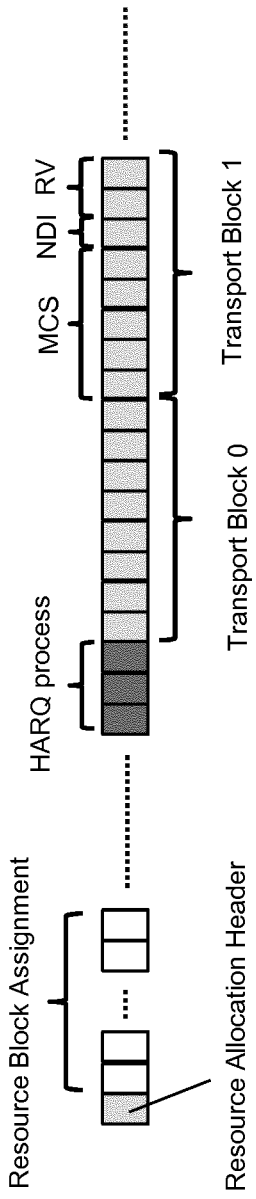
Fig. 11
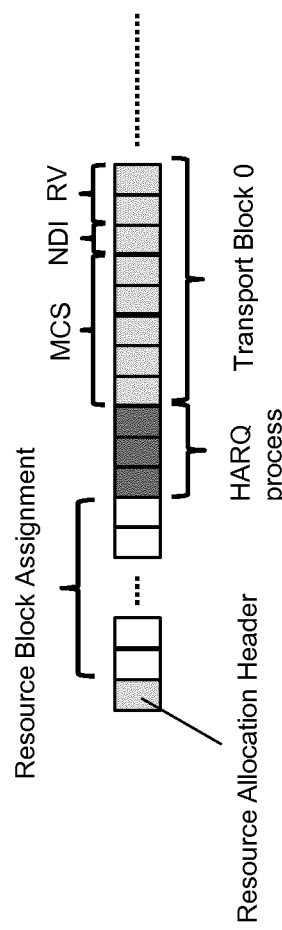
Fig. 12
Fig. 13
| TBS index | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|---|---|---|---|---|---|---|---|---|---|---|---|
| PDSCH length | 1 | 2 | 2 | 3 | 3 | 3 | 4 | 5 | 3 | 3 | 3 | 4 | 5 | 5 | X | X | X | X | X | X | X | X | X | X | X | X | X |

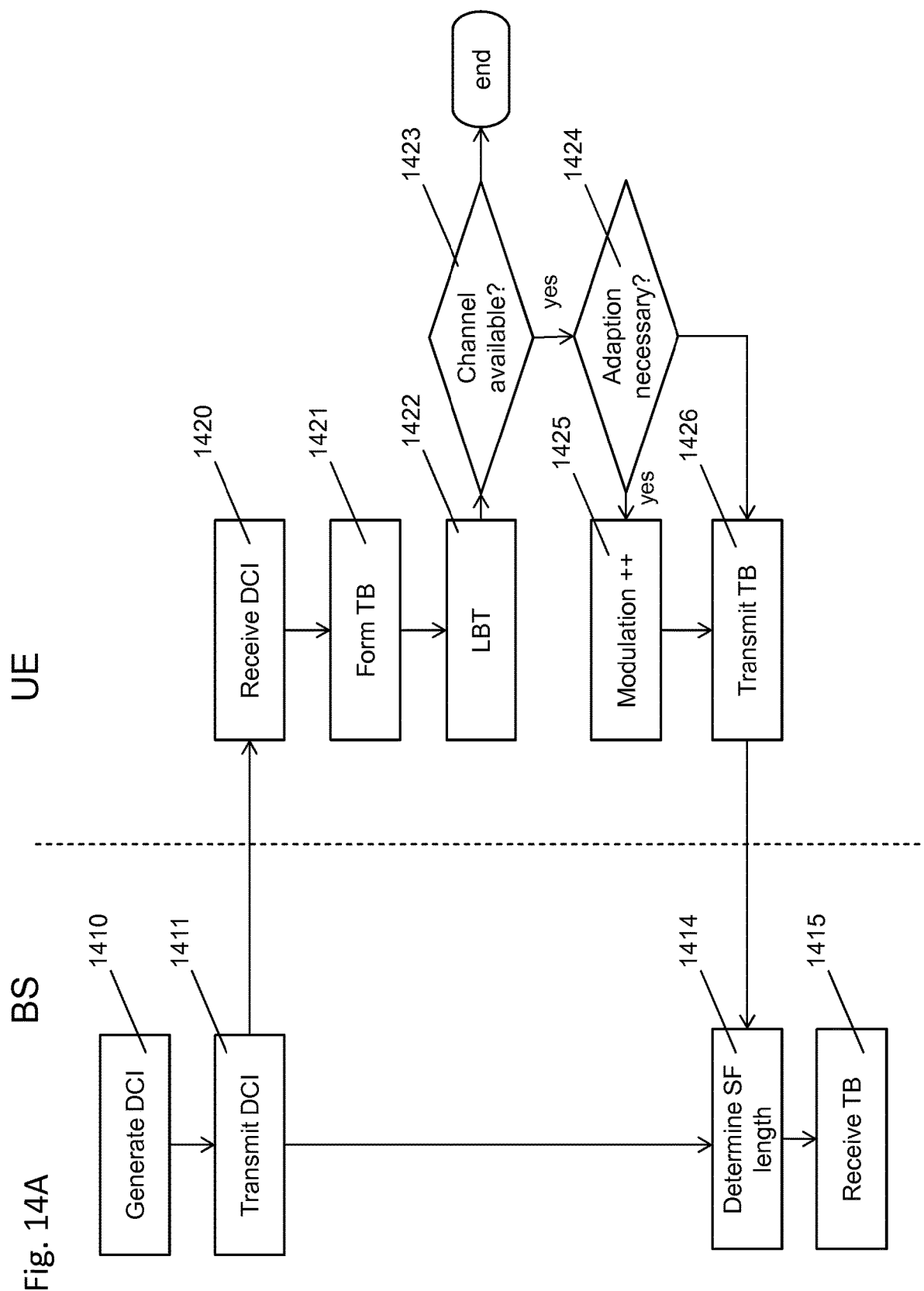

MODULATION ORDER ADAPTATION FOR PARTIAL SUBFRAMES

BACKGROUND

Technical Field

The present disclosure relates to transmission and reception of data on a band shared by two separate wireless systems so that a listen before talk procedure is employed before transmission even for scheduled data.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM)-based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA)-based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall LTE architecture is shown in FIG. 1. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMES/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle-state user equipments, the SGW terminates the downlink data path and triggers paging when downlink data arrives for the user equipment. It manages and stores user equipment contexts, e.g., parameters of the IP bearer service, or network internal routing information. It also performs replication of the user traffic in case of lawful interception.

The MME is the key control-node for the LTE access-network. It is responsible for idle-mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME, and it is also responsible for the generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE

The downlink component carrier of a 3GPP LTE system is subdivided in the time-frequency domain in so-called subframes. In 3GPP LTE each subframe is divided into two downlink slots as shown in FIG. 2, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consist of a number of modulation symbols transmitted on respective subcarriers. In LTE, the transmitted signal in each slot is described by a resource grid of $N_{RB}^{DL} N_{sc}^{RB}$ subcarriers and $N_{symb}^{DL}$ OFDM symbols.

$N_{RB}^{DL}$ is the number of resource blocks within the bandwidth. The quantity $N_{RB}^{DL}$ depends on the downlink transmission bandwidth configured in the cell and shall fulfill $N_{RB}^{min,DL} \leq N_{RB}^{DL} \leq N_{RB}^{max,DL}$, where $N_{RB}^{min,DL}=6$ and $N_{RB}^{max,DL}=110$ are respectively the smallest and the largest downlink bandwidths, supported by the current version of the specification. $N_{sc}^{RB}$ is the number of subcarriers within one resource block. For normal cyclic prefix subframe structure, $N_{sc}^{RB}=12$ and $N_{symb}^{DL}=7$.

Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g., 7 OFDM symbols) and consecutive subcarriers in the frequency domain as exemplified in FIG. 2 (e.g., 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure will apply to later releases too.

Carrier Aggregation in LTE-A for Support of Wider Bandwidth

The frequency spectrum for IMT-Advanced was decided at the World Radio communication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g., to fulfill the requirements on IMT-Advanced.

The bandwidth that the LTE-Advanced system is able to support is 100 MHz, while an LTE system can only support 20 MHz. Nowadays, the lack of radio spectrum has become a bottleneck of the development of wireless networks, and as a result it is difficult to find a spectrum band which is wide enough for the LTE-Advanced system. Consequently, it is urgent to find a way to gain a wider radio spectrum band, wherein a possible answer is the carrier aggregation functionality.

In carrier aggregation, two or more component carriers are aggregated in order to support wider transmission bandwidths up to 100 MHz. Several cells in the LTE system are aggregated into one wider channel in the LTE-Advanced system which is wide enough for 100 MHz even though these cells in LTE may be in different frequency bands.

All component carriers can be configured to be LTE Rel. 8/9 compatible, at least when the bandwidth of a component carrier does not exceed the supported bandwidth of an LTE Rel. 8/9 cell. Not all component carriers aggregated by a user equipment may necessarily be Rel. 8/9 compatible. Existing mechanisms (e.g., barring) may be used to avoid Rel-8/9 user equipments to camp on a component carrier.

A user equipment may simultaneously receive or transmit on one or multiple component carriers (corresponding to multiple serving cells) depending on its capabilities. An LTE-A Rel. 10 user equipment with reception and/or transmission capabilities for carrier aggregation can simultaneously receive and/or transmit on multiple serving cells, whereas an LTE Rel. 8/9 user equipment can receive and transmit on a single serving cell only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain (using the 3GPP LTE (Release 8/9) numerology).

It is possible to configure a 3GPP LTE-A (Release 10)-compatible user equipment to aggregate a different number of component carriers originating from the same eNodeB (base station) and of possibly different bandwidths in the uplink and the downlink. The number of downlink component carriers that can be configured depends on the downlink aggregation capability of the UE. Conversely, the number of uplink component carriers that can be configured depends on the uplink aggregation capability of the UE. It may currently not be possible to configure a mobile terminal with more uplink component carriers than downlink component carriers. In a typical TDD deployment the number of component carriers and the bandwidth of each component carrier in uplink and downlink is the same. Component carriers originating from the same eNodeB need not provide the same coverage.

The spacing between center frequencies of contiguously aggregated component carriers shall be a multiple of 300 kHz. This is in order to be compatible with the 100 kHz frequency raster of 3GPP LTE (Release 8/9) and at the same time to preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO for uplink) at most one transport block per component carrier. A transport block and its potential HARQ retransmissions need to be mapped on the same component carrier.

When carrier aggregation is configured, the mobile terminal only has one RRC connection with the network. At RRC connection establishment/re-establishment, one cell provides the security input (one ECGI, one PCI and one ARFCN) and the non-access stratum mobility information (e.g., TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected state. Within the configured set of component carriers, other cells are referred to as Secondary Cells (SCells); with carriers of the SCell being the Downlink Secondary Component Carrier (DL SCC) and Uplink Secondary Component Carrier (UL SCC). Maximum five serving cells, including the PCell, can be configured for one UE.

The characteristics of the downlink and uplink PCell are:
- For each SCell the usage of uplink resources by the UE in addition to the downlink ones is configurable (the number of DL SCCs configured is therefore always larger or equal to the number of UL SCCs, and no SCell can be configured for usage of uplink resources only)
- The downlink PCell cannot be deactivated, unlike SCells
- Re-establishment is triggered when the downlink PCell experiences Rayleigh fading (RLF), not when downlink SCells experience RLF
- Non-access stratum information is taken from the downlink PCell
- PCell can only be changed with handover procedure (i.e., with security key change and RACH procedure)
- PCell is used for transmission of PUCCH
- The uplink PCell is used for transmission of Layer 1 uplink control information
- From a UE viewpoint, each uplink resource only belongs to one serving cell The configuration and reconfiguration, as well as addition and removal, of component carriers can be performed by RRC. Activation and deactivation is done via MAC control elements. At intra-LTE handover, RRC can also add, remove, or reconfigure SCells for usage in the target cell. When adding a new SCell, dedicated RRC signaling is used for sending the system information of the SCell, the information being necessary for transmission/reception (similarly as in Rel-8/9 for handover). Each SCell is configured with a serving cell index, when the SCell is added to one UE; PCell has always the serving cell index 0.

When a user equipment is configured with carrier aggregation there is at least one pair of uplink and downlink component carriers that is always active. The downlink component carrier of that pair might be also referred to as "DL anchor carrier". Same applies also for the uplink.

When carrier aggregation is configured, a user equipment may be scheduled on multiple component carriers simultaneously, but at most one random access procedure shall be ongoing at any time. Cross-carrier scheduling allows the PDCCH of a component carrier to schedule resources on another component carrier. For this purpose a component carrier identification field is introduced in the respective DCI (Downlink Control Information) formats, called CIF.

A linking, established by RRC signaling, between uplink and downlink component carriers allows identifying the uplink component carrier for which the grant applies when there is no cross-carrier scheduling. The linkage of downlink component carriers to uplink component carrier does not necessarily need to be one to one. In other words, more than one downlink component carrier can link to the same uplink component carrier. At the same time, a downlink component carrier can only link to one uplink component carrier.

Layer 1/Layer 2 Control Signaling

In order to inform the scheduled users about their allocation status, transport format and other transmission-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/L2 control signaling need only be transmitted once per TTI. Without loss of generality, the following assumes that a TTI is equivalent to one subframe.

The L1/L2 control signaling is transmitted on the Physical Downlink Control Channel (PDCCH).

A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e., conveys L1/L2 control signaling, even though the detailed transmission methods are different from the PDCCH. Further details can be found particularly in the current versions of 3GPP TS 36.211 and 36.213, incorporated herein by reference. Consequently, most items outlined in the background and the embodiments apply to PDCCH as well as EPDCCH, or other means of conveying L1/L2 control signals, unless specifically noted.

Generally, the information sent in the L1/L2 control signaling for assigning uplink or downlink radio resources (particularly LTE(-A) Release 10) can be categorized to the following items:
- User identity, indicating the user that is allocated. This is typically included in the checksum by masking the CRC with the user identity;
- Resource allocation information, indicating the resources (e.g., Resource Blocks, RBs) on which a user is allocated. Alternatively this information is termed resource block assignment (RBA). Note, that the number of RBs on which a user is allocated can be dynamic;
- Carrier indicator, which is used if a control channel transmitted on a first carrier assigns resources that concern a second carrier, i.e., resources on a second carrier or resources related to a second carrier; (cross carrier scheduling);
- Modulation and coding scheme that determines the employed modulation scheme and coding rate;
- HARQ information, such as a new data indicator (NDI) and/or a redundancy version (RV) that is particularly useful in retransmissions of data packets or parts thereof;
- Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v12.4.0 available at http://www.3gpp.org and incorporated herein by reference). In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2.

Format 1: DCI Format 1 is used for the transmission of resource assignments for single code word PDSCH transmissions (downlink transmission modes 1, 2 and 7).

Format 1A: DCI Format 1A is used for compact signaling of resource assignments for single code word PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When format 1C is used, the PDSCH transmission is constrained to using QPSK modulation. This is used, for example, for signaling paging messages and broadcast system information messages.

Format 1D: DCI Format 1D is used for compact signaling of resource assignments for PDSCH transmission using multi-user MIMO. The information transmitted is the same as in Format 1B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10)

Format 3 and 3A: DCI formats 3 and 3A are used for the transmission of power control commands for PUCCH and PUSCH with 2-bit or 1-bit power adjustments respectively. These DCI formats contain individual power control commands for a group of UEs.

Format 4: DCI format 4 is used for the scheduling of the PUSCH, using closed-loop spatial multiplexing transmissions in uplink transmission mode 2.

The PDCCH carries DCI on an aggregation of one or a plurality of consecutive control channel elements (CCEs). A control channel element corresponds to 9 resource element groups (REG) of which each consists of four or six resource elements.

A search space indicates a set of CCE locations where the UE may find its PDCCHs. Each PDCCH carries one DCI and is identified by the RNTI (radio network temporary identity) implicitly encoded in the CRC attachment of the DCI. The UE monitors the CCEs of a configured search space(s) by blind decoding and checking the CRC.

A search space may be a common search space and a UE-specific search space. A UE is required to monitor both common and UE-specific search spaces, which may be overlapping. The common search space carries the DCIs that are common for all UEs such as system information (using the SI-RNTI), paging (P-RNTI), PRACH responses (RA-RNTI), or UL TPC commands (TPC-PUCCH/PUSCH-RNTI). The UE-specific search space can carry DCIs for UE-specific allocations using the UEs assigned C-RNTI, semi-persistent scheduling (SPS C-RNTI), or initial allocation (temporary C-RNTI).

LTE on Unlicensed Bands—Licensed-Assisted Access LAA

In September 2014, 3GPP initiated a new study item on LTE operation in unlicensed spectrum which has been concluded with TR 36.889 cited above, in June 2015. A corresponding work item addressing the specification of LTE for unlicensed band operation was initiated in June 2015 and will start in August 2015 at 3GPP RAN1#82. The reason for extending LTE to unlicensed bands is the evergrowing demand for wireless broadband data in conjunction with the limited amount of licensed bands. Unlicensed spectrum therefore is more and more considered by cellular operators as a complementary tool augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation in unlicensed bands will therefore at least in the beginning be considered rather a complement to LTE on licensed spectrum than stand-alone operation in unlicensed spectrum. Based on this assumption, 3GPP established the term Licensed Assisted Access (LAA) for the LTE operation in unlicensed bands in conjunction with at least one licensed band. Future stand-alone operation of LTE in unlicensed spectrum without relying on LAA is however not excluded.

The current intended general LAA approach at 3GPP is to make use of the already specified Rel-12 carrier aggregation (CA) framework as much as possible where the CA framework configuration comprises a so-called primary cell (PCell) carrier and one or more secondary cell (SCell) carriers. CA supports in general both self-scheduling of cells (scheduling information and user data are transmitted on the same carrier) and cross-carrier scheduling between cells (scheduling information in terms of PDCCH/EPDCCH and user data in terms of PDSCH/PUSCH are transmitted on different carriers).

The basic envisioned approach at 3GPP is that the PCell will be operated on a licensed band while one or more SCells will be operated in unlicensed bands. The benefit of this strategy is that the PCell can be used for reliable transmission of control messages and user data with high quality of service (QoS) demands, such as for example voice and video, while a PCell in unlicensed spectrum might yield, depending on the scenario, to some extent significant QoS reduction due to inevitable coexistence with other RATs. A very basic scenario is illustrated in FIG. 3, with a licensed PCell, licensed SCell 1, and various unlicensed SCells 2, 3, and 4 (exemplarily depicted as small cells). The transmission/reception network nodes of unlicensed SCells 2, 3, and 4 could be remote radio heads managed by the eNB or could be nodes that are attached to the network but not managed by the eNB. For simplicity, the connection of these nodes to the eNB or to the network is not explicitly shown in the figure.

It has been agreed at 3GPP, that the LAA investigation and specification will focus in the first step on unlicensed bands at 5 GHz. One of the most critical issues is therefore the coexistence with Wi-Fi (IEEE 802.11) systems operating in these unlicensed bands. In order to support fair coexistence between LTE and other technologies such as Wi-Fi as well as fairness between different LTE operators in the same unlicensed band, the channel access procedures of LTE for unlicensed band operation has to abide by certain sets of regulatory rules which depend on region (Europe, US, China, Japan, etc.) and considered frequency band. A comprehensive description of the regulatory requirements for operation in unlicensed bands at 5 GHz is given in 3GPP TR 36.889, v13.0.0 of June 2015, titled "Study on Licensed-Assisted Access to Unlicensed Spectrum", available at www.3gpp.org. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, can however rely on another device, that is associated with the master, to implement the radar detection.

The operation in unlicensed bands at 5 GHz is in most regions limited to rather low transmit power levels compared to the operation on licensed bands, resulting in small coverage areas. A further requirement for certain regions and bands is the use of TPC in order to reduce the average level of interference caused to other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

The energy detection for the CCA is performed over the whole channel bandwidth (e.g., 20 MHz in unlicensed bands at 5 GHz), which means that the reception power levels of all subcarriers of an LTE OFDM symbol within that channel contribute to the evaluated energy level at the device that performed the CCA.

Furthermore, the total time during which an equipment occupies a given unlicensed channel by means of continuous transmission without re-evaluating the availability of that channel (i.e., LBT/CCA) is defined as the Channel Occupancy Time (see ETSI 301 893, under clause 4.8.3.1). The Channel Occupancy Time shall be in the range of 1 ms to 10 ms, where the maximum Channel Occupancy Time could be, e.g., 4 ms, as currently defined for Japan. There is furthermore a minimum Idle time during which the equipment is not allowed to occupy the unlicensed channel again after a transmission on that unlicensed channel, the minimum Idle time being at least 5% of the preceding Channel Occupancy Time. At the end of the Idle Period, the UE can perform a new CCA, and so on. This transmission behavior is schematically illustrated in FIG. 4, the figure being taken from ETSI EN 301 893 (there FIG. 2: "Example of timing for Frame Based Equipment").

Considering the different regulatory requirements, it is apparent that the LTE specification for operation in unlicensed bands will required several changes compared to the current Rel-12 specification that is limited to licensed band operation.

LAA Downlink Burst

In contrast to LTE operation in licensed bands, the character of unlicensed band operation is shaped by discontinuous transmissions due to the required LBT behavior in combination with restriction of the maximum allowed channel occupation duration as described above.

LAA downlink transmissions therefore exhibit a burst structure, where each transmission burst is preceded by a listening phase serving the clear channel assessment (CCA) and the continuous signal transmission from the eNB. This signal transmission phase can comprise a multitude of different signals in addition to the data bearing signals; such as for example reservation signals, synchronization signals and reference signals. This signal transmission phase will be referred to as LAA downlink burst in the following. Each LAA downlink burst comprises typically multiple LTE subframes.

It has been agreed at RAN1 during the LAA study item phase that the subframe boundaries of a licensed PCell and an unlicensed SCell will be aligned as described in 3GPP TR 36.889, v13.0.0 of June 2015, titled "Study on Licensed-Assisted Access to Unlicensed Spectrum", available at www.3gpp.org. In particular, the subframe boundaries will not be adapted to the channel occupation conditions that determine the channel access behavior by means of clear channel assessment (CCA). However, Wi-Fi nodes that operate in the same band with the LTE node will not follow the LTE subframe boundary pattern which means that the channel can become free at any moment between the LTE subframe boundaries.

In order to occupy the channel after a successful CCA, the eNB can therefore transmit a reservation signal that blocks the channel until the next subframe boundary is reached. This approach is depicted in FIG. 5A.

The reservation signal does not necessarily carry user data in terms of PDSCH. It can for example constitute a simple energy burst that merely triggers the energy detection in other nodes that compete for the channel access. It could furthermore constitute a specific signal sequence that can be used for burst detection, synchronization, channel estimation, automatic gain control in nodes that receive the LAA burst.

In order to increase the spectral efficiency of LAA transmissions, the concept of partial subframes has been proposed by different companies and is currently under discussion at RAN1 as described in TR 36.889, cited above. A partial subframe is a subframe that does not occupy all OFDM symbols between the subframe boundaries, in contrast to full subframes that occupy all resources between two consecutive subframe boundaries. In other words, a partial subframe is shorter than a subframe within the time domain. The use of partial subframes for LAA is depicted in FIG. 5B.

As in case of full subframes, a partial subframe may comprise a control region in addition to a data region in the time domain as shown in FIG. 5C. Corresponding to the LTE operation in licensed bands, the control region carries the scheduling information related to the PDSCH allocation in the subsequent data region.

The control region is required in case of self-scheduling of PDSCH transmissions on the unlicensed band SCell by means of PDCCHs, while it is not required in case of cross-scheduling from a licensed PCell. Self-scheduling with EPDCCH on the unlicensed SCell is another option. This would not require a control region in time domain since the EPDCCH is multiplexed with the PDSCH in frequency domain. There was so far no agreement at 3GPP on the supported scheduling schemes for LAA. The term "self-scheduling" means that the signaling information such as scheduling grants are transmitted within the same carrier on which the resources is granted. The term "cross-scheduling" on the other hand means that the signaling of grants on a carrier is transmitted on another (cross-scheduling) carrier.

The length of a partial subframe at the beginning of an LLA downlink burst is in general unknown in advance since both transmitting eNB and receiving UE do not know at which point of time the channel can be occupied based on successful CCA. In other words, the length of the subframe is known after performing CCA but not beforehand.

It is possible to reduce the number of possible starting points (in terms of OFDM symbols) of the first partial subframe of an LAA burst, such as for example subframe boundary and the middle between two subframe boundaries, corresponding to full and half subframe. In such as case it can be reasonable to combine a partial subframe with a preceding reservation signal as shown in FIG. 5D. In particular, the reservation signal is transmitted in a half of a subframe which is not entirely available for transmission. The reservation signal is transmitted in the portion of the half-subframe which is available after CCA. On the other hand, a half that is entirely available as partial subframe can be used for transmission of data.

In addition or alternatively to partial subframes at the start of an LAA burst, it is also possible to support partial subframes at the end of an LAA burst. The benefit of using an additional partial subframe at the end of the burst is that this allows for efficient utilization of the allowed maximum channel occupation duration, such as for example 4 ms in Japan as described in TR 36.889, cited above.

However, it is unclear how the partial subframes can be efficiently utilized, i.e., how to map data into fractions of subframes.

BRIEF SUMMARY

In view of the above, it would be advantageous to provide a transmission and reception in wireless communication system in which before a scheduled transmission a listen before talk procedure is necessary, which could make also an efficient use of the fractions of subframes.

One non-limiting and exemplary embodiment provides an improved method for transmitting transport blocks in subframes of a predefined length within a wireless communication system, including the following steps: receiving or generating a downlink control information including a resource grant comprising a predetermined modulation and a predetermined transport block size, generating a transport block including channel coded data to be transmitted in a subframe with the predetermined modulation and the predetermined transport block size, performing sensing in the subframes and determining whether a partial subframe or a complete subframe is available for transmission of the generated transport block; transmitting the transport block with a modified modulation different from the predetermined modulation if the partial rather than complete subframe is available.

Another non-limiting and exemplary embodiment provides an improved method for receiving transport blocks in subframes of a predefined length within a wireless communication system, including the following steps: receiving or generating a downlink control information including a resource grant comprising a predetermined modulation and a predetermined transport block size, determining whether a transport block including channel coded data to be received according to the grant is to be received in a partial subframe or a complete subframe, receiving and decoding the transport block with a modified modulation different from the predetermined modulation if the transport block is received in the partial rather than the complete subframe.

The independent claims provide non-limiting and exemplary embodiments. Advantageous embodiments are subject to the dependent claims.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

These general and specific aspects may be implemented using a system, a method, and a computer program, and any combination of systems, methods, and computer programs.

BRIEF DESCRIPTION OF THE SEVERAL VIEWS OF THE DRAWINGS

In the following exemplary embodiments are described in more detail with reference to the attached figures and drawings.

FIGS. 7A, 7B are schematic drawings illustrating currently allowed TBS-MCS combinations, FIGS. 9A, 9B are schematic drawings illustrating TBS-MCS combinations allowed for modulation order adaption, FIG. 11 is a schematic drawing illustrating format of a DCI for two transport blocks, FIG. 12 is a schematic drawing illustrating format of a DCI for one transport block, FIG. 13 is a schematic drawing illustrating a table defining allowed PDSCH length for different TBS, FIG. 14A is a flow diagram illustrating a method of an embodiment according to the present disclosure for transmission and reception in uplink.

DETAILED DESCRIPTION

A mobile station or mobile node or user terminal or user equipment is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "radio resources" as used in the set of claims and in the application is to be broadly understood as referring to physical radio resources, such as time-frequency resources.

The term "unlicensed cell" or alternatively "unlicensed carrier" as used in the set of claims and in the application is to be understood broadly as a cell/carrier in an unlicensed frequency band. Correspondingly, the term "licensed cell" or alternatively "licensed carrier" as used in the set of claims and in the application is to be understood broadly as a cell/carrier in a licensed frequency band. Exemplarily, these terms are to be understood in the context of 3GPP as of Release 12/13 and the Licensed-Assisted Access Work Item.

A transport block (TB) that will be transmitted in a physical downlink shared channel (PDSCH) has to be prepared prior to the transmission of the PDSCH itself. A certain number of bits, given by the transport block size (TBS), are taken from a specific HARQ process queue of the MAC layer and passed down to the PHY (physical layer) together with a corresponding MAC header.

Figure 1:
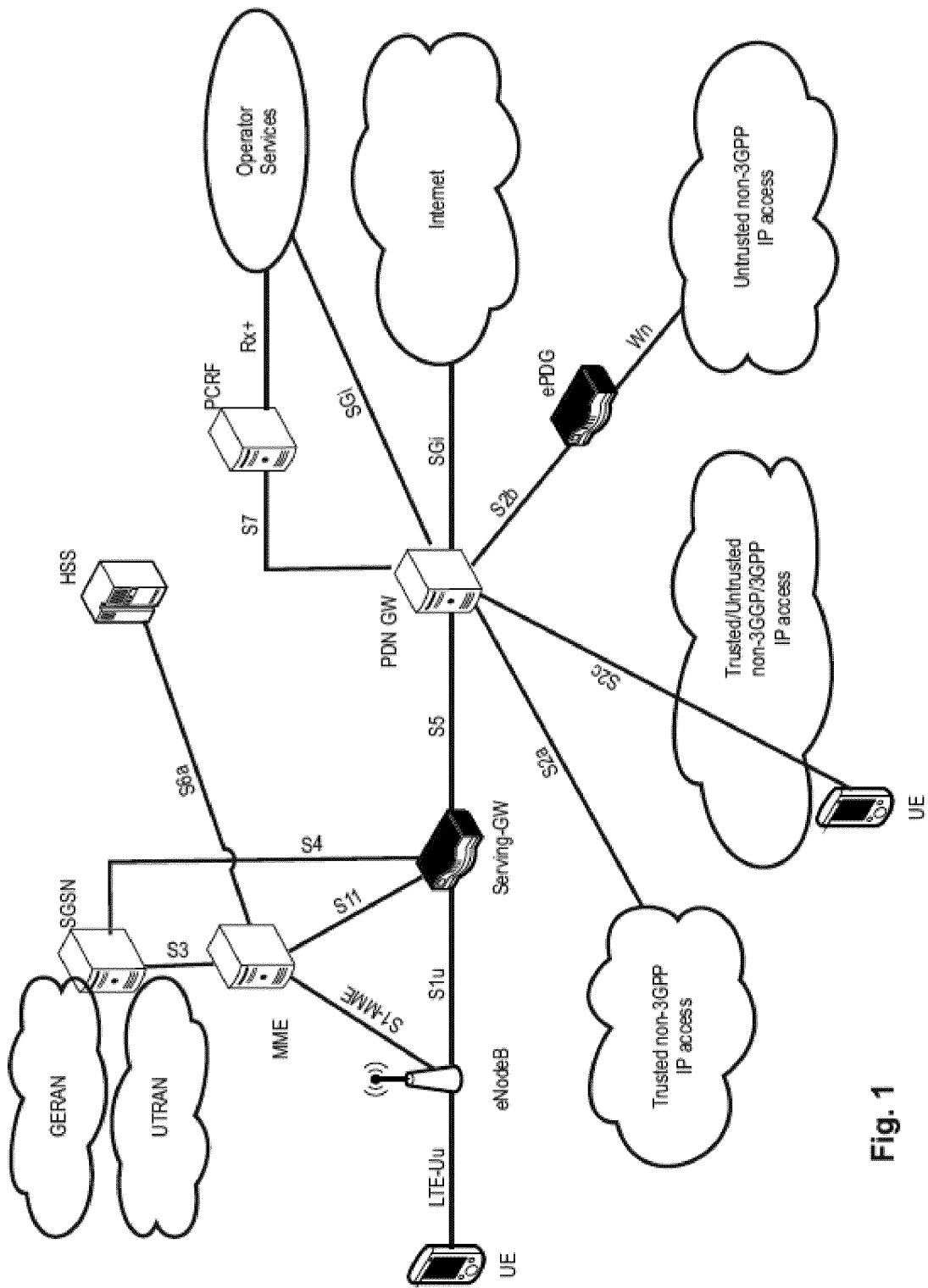
FIG. 1 shows an exemplary architecture of a 3GPP LTE system.
Figure 2:
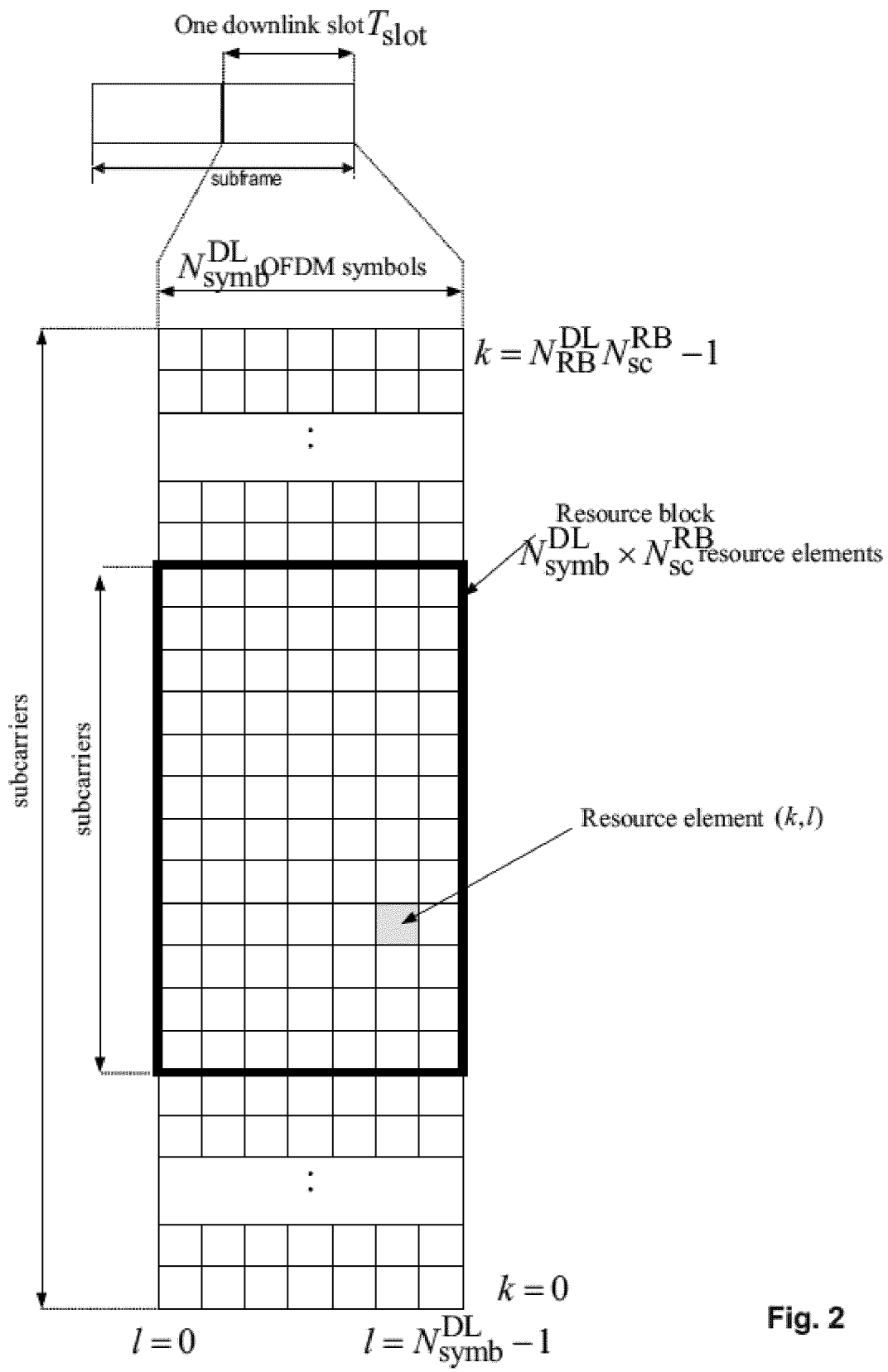
FIG. 2 shows an exemplary downlink resource grid of a downlink slot of a subframe as defined for 3GPP LTE (Release 8/9)
Figure 3:
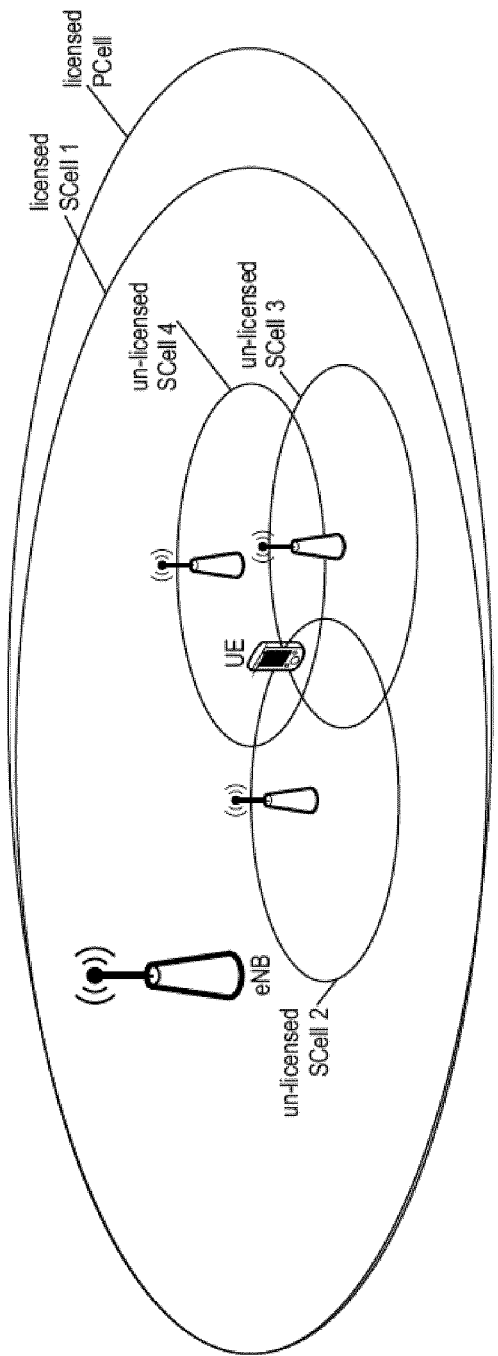
FIG. 3 illustrates an exemplary licensed-assisted access scenario, with various licensed and unlicensed cells.
Figure 4:
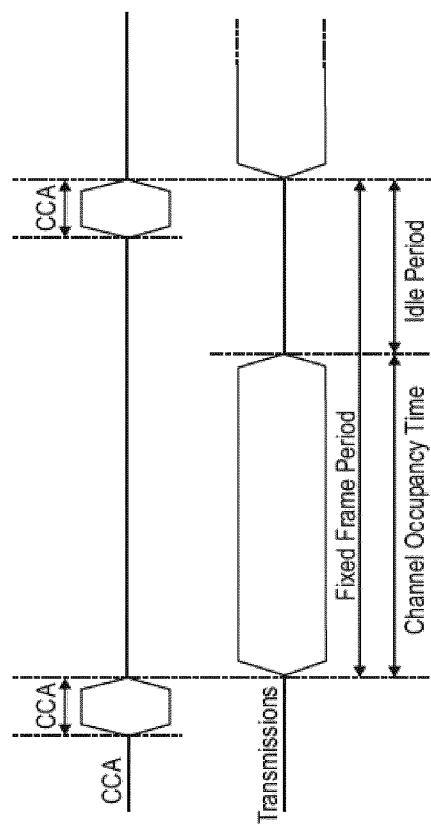
FIG. 4 illustrates schematically the transmission timing on an unlicensed band, including the different periods, Channel Occupancy Time, Idle Period, and Fixed Frame Period.
Figure 5A:
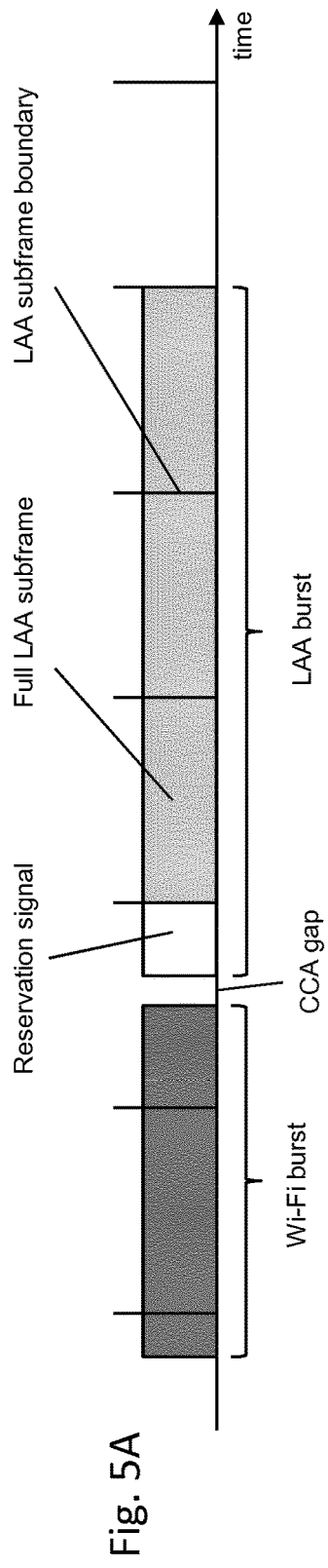
FIG. 5A is a schematic drawing illustrating, usage of partial subframes for transmission of reservation signal
Figure 5B:
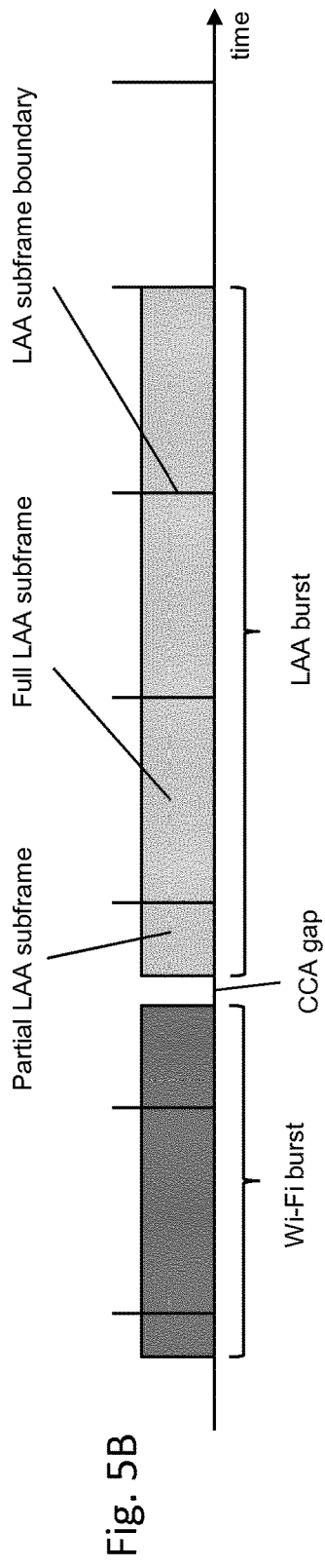
FIG. 5B is a schematic drawing illustrating usage of partial subframes for transmission of data.
Figure 5C:
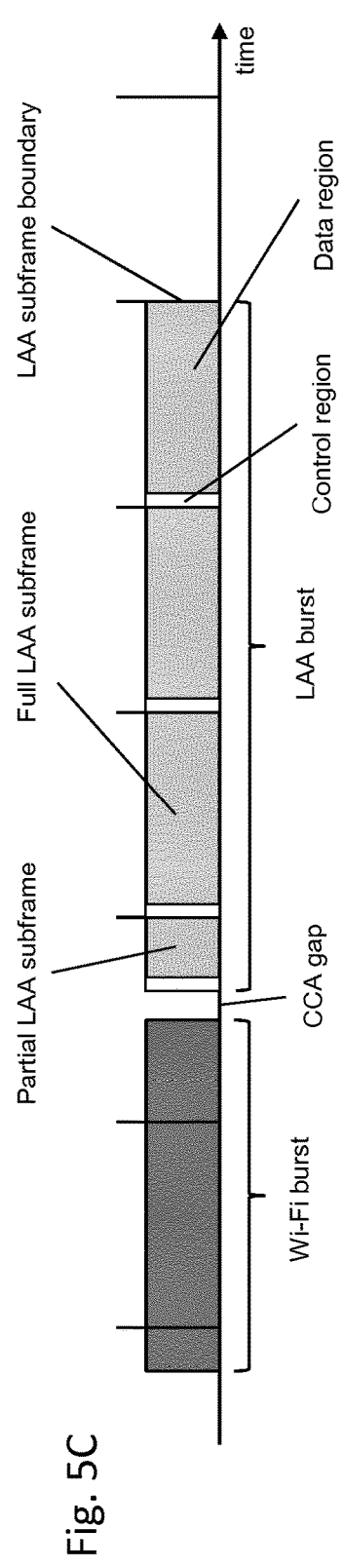
FIG. 5C is a schematic drawing illustrating partial subframes for transmission of user data and signaling data.
Figure 5D:
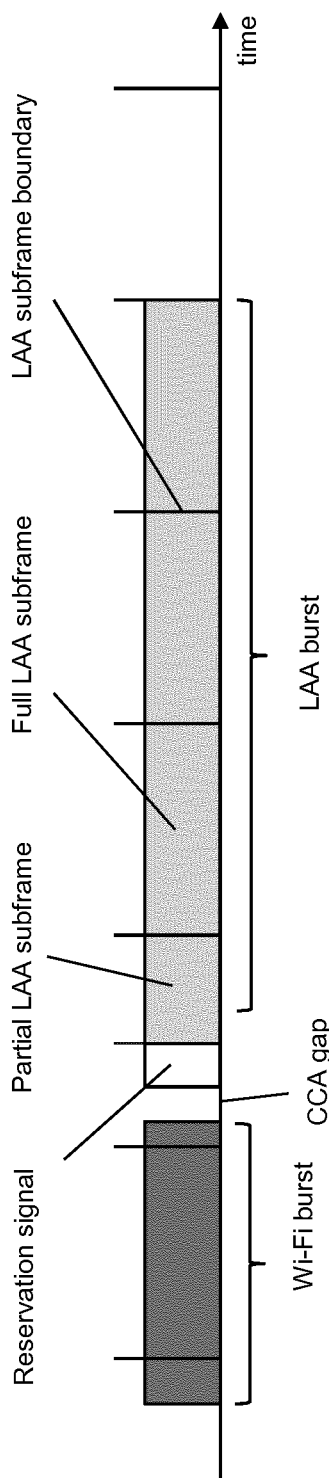
FIG. 5D is a schematic drawing illustrating partial subframes for transmission of user in a half of subframe.
Figure 6:
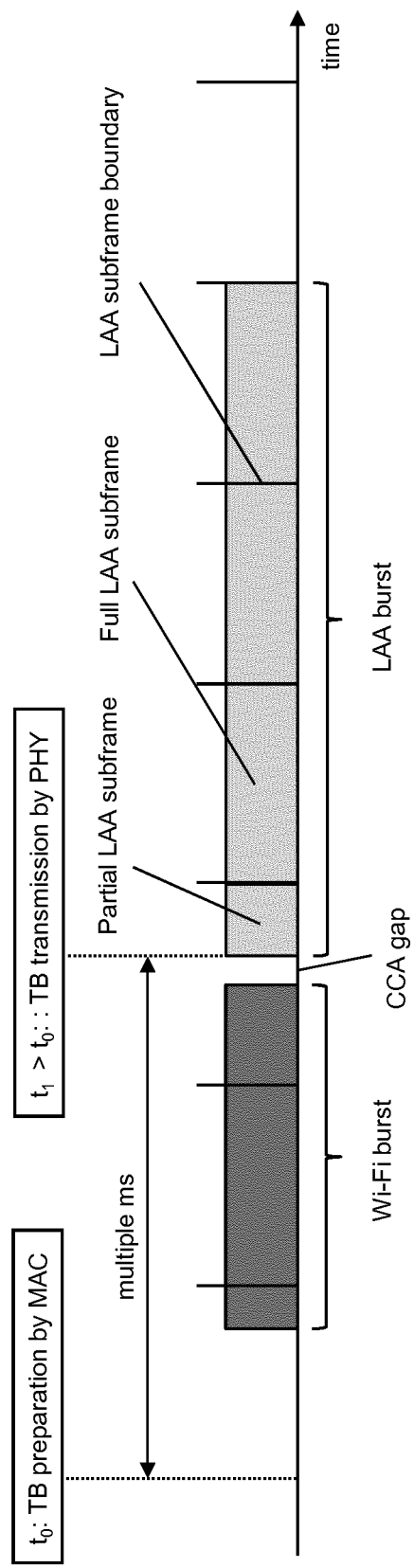
FIG. 6 is a schematic drawing illustrating timing of the LAA burst transmission procedure.

The timing relation between TB preparation and TB transmission is shown in FIG. 6. The time t1-t0 between preparation and transmission typically comprises multiple milliseconds in typical LTE implementations. The time difference between the moment of TB preparation and TB transmission has the effect that the length of the partial subframe is not known at the moment of TB preparation since it is not clear at which point of time the channel will be available in terms of CCA. The length of the partial subframe is basically determined by the behavior of co-existing equipment (such as for example Wi-Fi nodes), over which the LAA transmitter (LTE base station in case of LAA downlink) has no control.

The length of the partial subframe directly affects the length, and hence the number of REs, of a PDSCH that is transmitted in a partial subframe. The exact number of REs is thereby given by the combination of PDSCH length and the number of REs within the allocation that are used for other purposes than PDSCH transmission, such as for example reference signals (CRS, DMRS, etc.) or synchronization and discovery signals (PSS, SSS, etc.). Number and position of reference, synchronization and discovery signals have so far not been specified for LTE operation in unlicensed bands.

Since the actual length of a partial subframe (and hence the number of available REs) is not known at the moment of TB determination, it can happen that the TBS that has been determined in advance will not fit into the partial subframe due to exceeding a maximum supported code rate if the partial subframe is too short. As specified Section 7.1.7 of 3GPP TS 36.213, v12.6.0, June 2015, titled "Evolved Universal Terrestrial Radio Access (E-UTRA); Physical layer procedures", available at www.3gpp.org, the maximum supported code in LTE is 0.931.

One solution for this problem is to prepare and schedule only a small transport blocks on the partial subframe. This will prevent exceeding the maximum supported code rate, but it will at the same time limit the achievable throughput in the partial subframe.

The present disclosure is directed to support of modulation order adaptation for partial subframes. For this purpose, the currently supported two mappings of TBS indices to modulation orders in LTE as shown in FIG. 7A and FIG. 7B is extended by the possibility to use higher modulation order as well.

One of the essential features of LTE is the support of adaptive modulation and coding for PDSCH transmissions.

In the current LTE specification (Rel-12), the modulation and coding scheme (MCS) is determined by the parameters modulation order, transport block size (TBS) and number of resource elements (REs) that are used for the transport block transmission.

Supported modulation orders (number of bits per modulation symbol) for LTE in licensed bands comprise 2, 4, 6 and 8; corresponding to QPSK, 16 QAM, 64 QAM and 256 QAM, respectively. Whether all of them will be supported for unlicensed band operation as well has not been discussed so far, but it is advantageous if the same set of modulation order will be supported for unlicensed band operation as well.

The TBS is determined by the TBS index that is indicated to the UE within the DCI and the number of PRBs that are allocated for the PDSCH transmission as described in Section 7.1.7 of 3GPP TS 36.213, v12.6.0, June 2015, titled "Evolved Universal Terrestrial Radio Access (E-UTRA); Physical layer procedures", available at www.3gpp.org. The LTE specification contains a two-dimensional TBS table of which the TBS index and number of scheduled PBRs indicates row and column, respectively.

Each modulation order can only be used for a limited set of TBS indices in case of initial transport block transmissions. In case of retransmissions, each modulation order can be used for any TBS index. FIG. 7A and FIG. 7B show the currently (Rel-12) supported combinations of modulation order and TBS index for PDSCH transmissions without 256 QAM and with 256 QAM, respectively.

Table 1 and Table 2 below show the modulation and TBS index table for configurations without 256 QAM and with 256 QAM as defined in Section 7.1.7.1 of TS 36.213 cited above, respectively.

TABLE 1

First modulation and TBS index table as defined in TS 36.213

| MCS Index | Modulation Order | TBS Index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 2

Second modulation and TBS index table as defined in TS 36.213

| MCS Index | Modulation Order | TBS Index |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33 |
| 28 | 2 | reserved |
| 29 | 4 | |
| 30 | 6 | |
| 31 | 8 | |

In the first case without 256 QAM, certain TBS indices can be used with two modulation orders; TBS index 9 with modulation order 2 (QPSK) and 4 (16 QAM), and TBS index 13 with modulation order 4 (16 QAM) and 6 (64 QAM). The supported combinations of modulation order and TBS index are mapped to modulation and coding scheme (MCS) indices, as shown in Table 1 and Table 2. The MCS index for a PDSCH transmission is indicated to the addressed UE within the DCI that is transmitted either via PDCCH or EPDCCH. Each PDSCH transmission is therefore associated to a certain MSC index.

The code rate of a PDSCH transmission is given by the combination of transport block size, modulation order and number of REs onto which the PDSCH will be mapped, as captured in Equation 1 below where CR, TBS, M and N_RE are code rate, transport block size, modulation order and number of REs, respectively. As described above, the number of PRBs and thus also number of REs is a function of the length of the partial subframe.

Code rate determination        Equation 1

$$CR = \frac{TBS}{M \times N_{RE}}$$

In other words, the code rate is a ratio of the number of bits before coding and after coding. The maximum supported rate may be defined in the standard or may be configurable in general.

Figure 8:
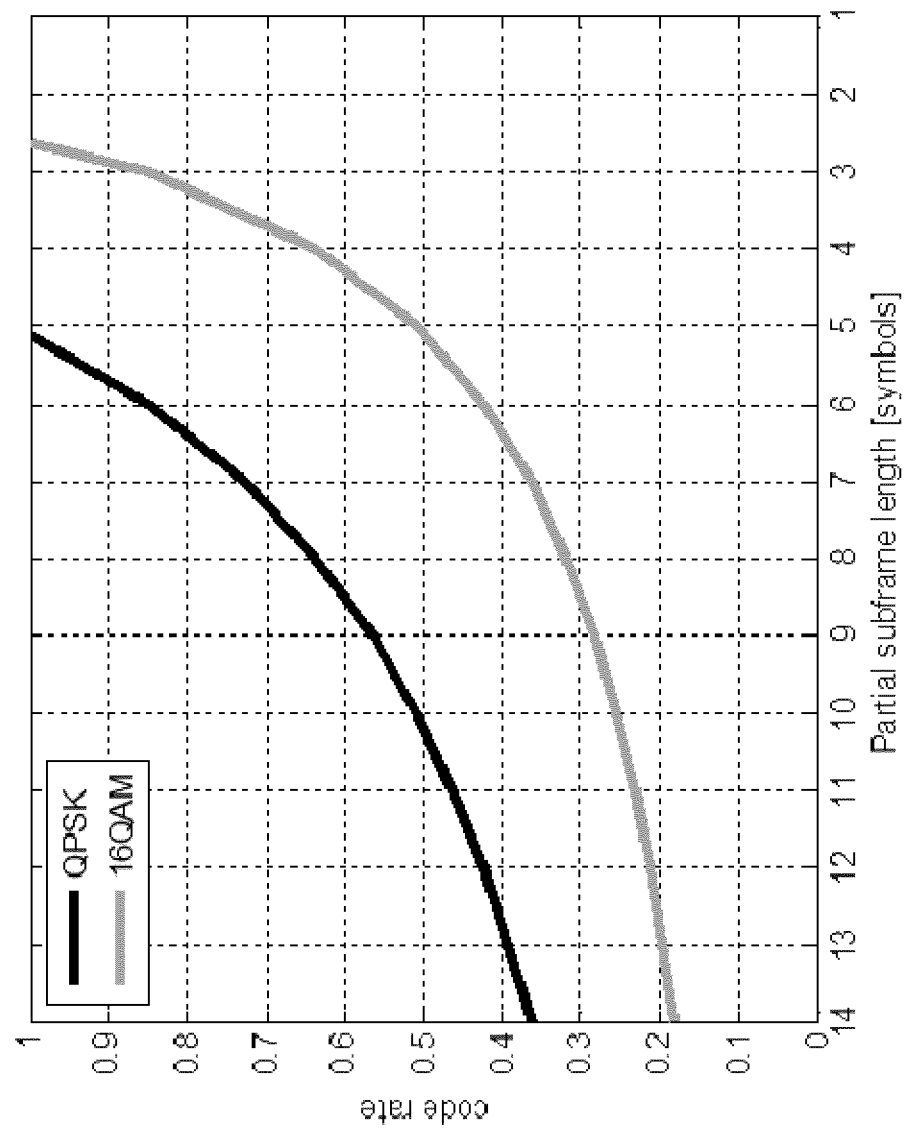
FIG. 8 is a graph illustrating code rate achieved dependent on the partial subframe lengths for different modulations.

FIG. 8 shows exemplary code rates for QPSK and 16 QAM depending on the partial subframe length with TBS index 8 and an allocation of 100 PBRs. This corresponds to a transport block size of 14112 bits. It is assumed in this example that 12 REs per PRB are available for PDSCH allocation in each OFDM symbol. The number of REs used for the PDSCH transmission is therefore to 12×100×N, where N is the length of the partial subframe in terms of OFDM symbols. The existence of reference or synchronization and discovery signals is not taken into account in this calculation. To be more precise, the REs carrying such signals would need to be subtracted from the result of the above calculation.

FIG. 8 clearly shows how the code rate grows when the length of the partial subframe is reduced. It can furthermore be seen that the code rate will be reduced if the modulation order is increased. The maximum supported code rate in LTE is 0.931 as described in Section 7.1.7 of TS 36.213 cited above. PDSCH transmissions with higher code rates cannot be expected to be supported on the UE side. The UE may skip decoding a transport block in an initial transmission in case of higher code rates. It can also be seen that modulation scheme QPSK (modulation order=2) thus cannot be used for partial subframes having less than 6 OFDM symbols.

In the LTE there is already a concept similar to partial subframes. In particular, LTE operation in TDD mode, where downlink and uplink transmission phases alternate on a single frequency channel in time, employs special subframes for switching between uplink and downlink transmission phase. These special subframes consist of downlink transmission phase (DwPTS), switching gap (GP), and uplink transmission phase (UpPTS). The structure of such a special subframe is given by a special subframe configuration as described in Section 4.2 of 3GPP TS 36.213 cited above. The special subframe structure is configured in a semi-static fashion, which means that it will not change frequently and that the length of both uplink and downlink transmission phase within the special subframe is known in advance. It is furthermore exactly known at which moments in time a special subframe will occur.

For these special subframes, an adaptation factor has been introduced for the TBS determination as shown in Equation 2 below. The TBS is not given by the number of allocated PRBs (N_PRB) but by multiplying the number of allocated PRBs with a certain configured adaptation factor (α). The current LTE specification supports α=0.375 and α=0.75, depending on the special subframe configuration.

$$N_{PRB} = \max(\lfloor N'_{PRB} \times \alpha \rfloor, 1)$$    Equation 2: PRB adaptation factor Dynamic changing of the adaptation factor independent of the special subframe configuration is not supported. The effect of the adaptation factor is that smaller transport blocks than in case of full subframe allocations will be mapped onto downlink transmissions with reduced duration in a special subframe.

The DCI that indicates the PDSCH allocation for a UE does not contain a description of the length of the PDSCH in terms of number of OFDM symbols. In case of licensed band operation, the PDSCH length is implicitly known on UE side since it knows the length of control region (configured semi-statically or signaled in dynamic fashion by means of control format indicator (CFI) as described in Section 5.3.4 of TS 36.212 cited above) and the special subframe configuration in case of TDD. This approach cannot be adopted for the use of partial subframes at the start of an LAA downlink burst since the length of the partial subframe is not known beforehand as mentioned above.

In other words, in order to adapt the size of the transport block to the possibility of having partial subframes, the transport block would need to have a rather small size in order to fit the worst-case partial subframe, i.e., subframe with the smallest length at which steel transmission of data therein is supported. This on the other hand would result in limited throughput in the first subframe (partial subframe) of the downlink LAA burst due to small transport block size even in case of full subframe usage for the PDSCH transmission. Moreover, the throughput performance would strongly depend on combination of scaling factors setting and partial subframe length distribution. In case of combination of long partial subframes and low scaling factors such as 0.375 inefficient resource utilization would be the result. On the other hand, in case of combination of short partial subframes and large scaling factor such as 0.75 this would result in impossibility of transport block transmission. As can be seen, there is no flexibility if the fixed scaling factor for the first subframe was adopted.

Nevertheless, the present disclosure provides for using partial subframes at the start or the end of the LAA burst without reservation signal, control region and restrictions of the partial subframe length in terms of allowed starting positions.

In particular, a method is provided for transmitting transport blocks in subframes of a predefined length within a wireless communication system. Transport blocks are data units which are received from the MAC layer to be mapped onto the subframes. Subframes are physical channel time-domain units with a fixed predefined time. The wireless communication system may be for instance an LTE-A system. However, the present disclosure is not limited thereto and may be used with any other wireless communication system in which partial subframe length becomes known when the transport block to be mapped thereon has already been formed.

The method includes the steps of receiving or generating a downlink control information, DCI, including a resource grant comprising a predetermined modulation and a predetermined transport block size, generating a transport block including channel coded data to be transmitted in a subframe with the predetermined modulation and the predetermined transport block size, performing sensing in the subframes and determining whether a partial subframe or a complete subframe is available for transmission of the generated transport block, and transmitting the transport block with a modified modulation different from the predetermined modulation when partial rather than complete subframe is available.

The above method for transmission of transport blocks can be implemented in any device of the wireless communication system. For instance, the above method for transmitting can be implemented at the UE side for uplink transmissions. In this case, the UE receives rather than generates the DCI. However, the above method for transmitting the transport blocks can also be implemented at the base station (eNB), i.e., as downlink transmission. In such case, the base station generates rather than receives the DCI. Moreover, the base station may map the DCI onto the resources corresponding to the search space of the UE and transmits it.

In general, the DCI is generated by a scheduling entity such as base station and specifies the resources granted also in terms of modulation and coding scheme. In particular, the modulation may be specified merely by modulation order, if the order can be unambiguously assigned to a particular modulation. The transport block size determines which coding rate may be used. The sensing corresponds to the above described CCA, or in other words, to the LBT procedure. It may be performed by measuring power within the subframe(s) and/or by searching for some predefined signal such as a preamble or any other reference signal. Based on the results of sensing, the availability of complete/partial subframe is determined. In other words, by means of sensing it is determined at which time point the channel becomes free. This approach can be used for instance in a system in which two systems that do not share the same scheduler may coexist.

The method may further include the step of transmitting the transport block with the predetermined modulation when a complete subframe is available. The availability here is evaluated for the next upcoming transmission opportunity (subframe).

This approach provides the advantage that conventional transport block size selection and indication to the UE would be supported, as defined for instance in the LTE or LTE-A standard. This means that the transport block size selection will be signaled by the MCS index and the number of scheduled PRBs.

Figures 9A, 9B:
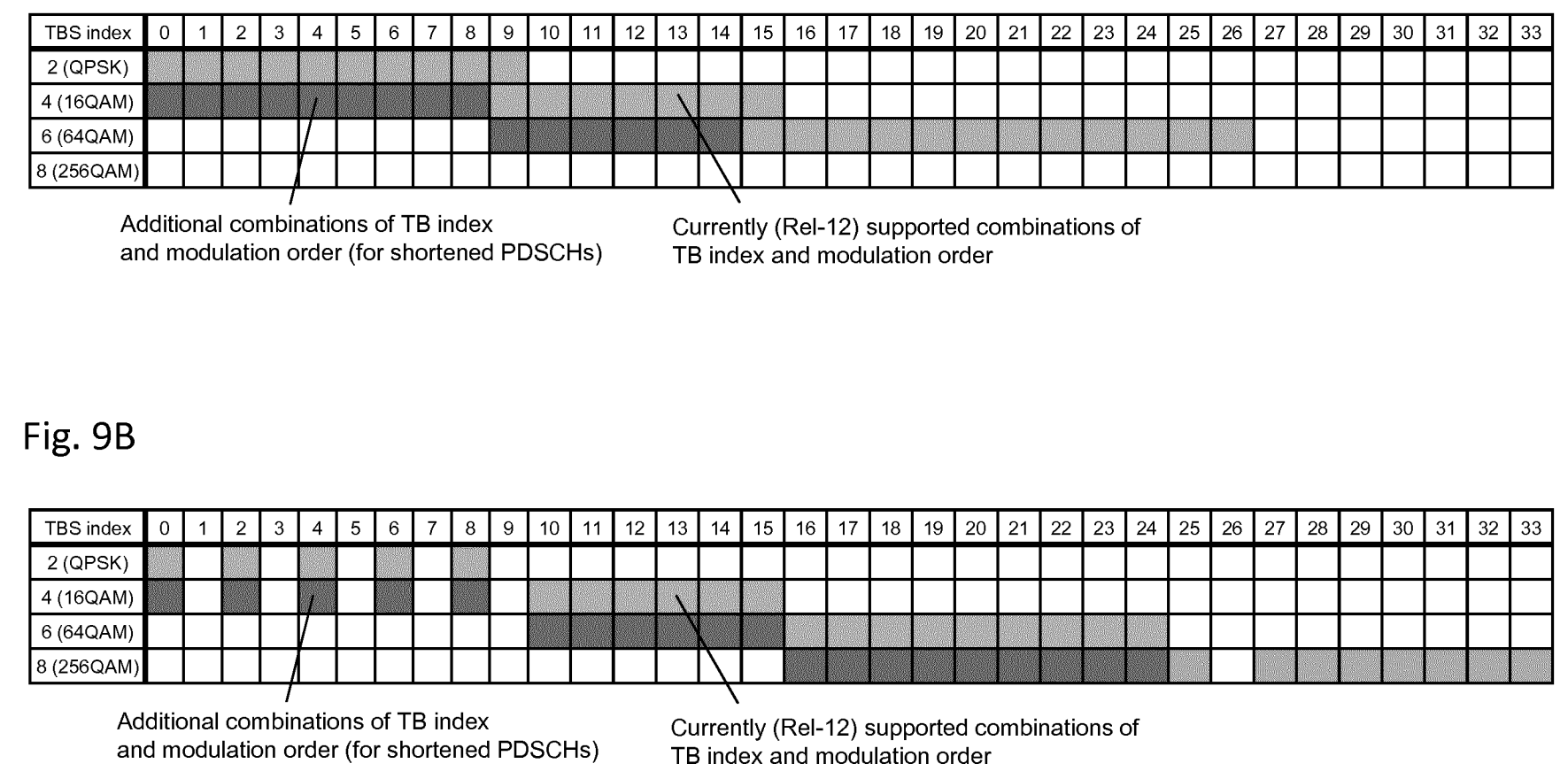

Exemplary extensions that support one additional modulation order for each TB S index are shown in FIG. 9A and FIG. 9B for UEs without 256 QAM and with 256 QAM configuration, respectively. The effect of switching the modulation order for a certain given TBS and number of REs from a low modulation order to a high modulation order, such as for example from 2 (QPSK) to 4 (16 QAM), will reduce the code rate for that TB transmission as shown in Equation 1 since the number of bits that are mapped to a modulation symbol is increased. It is noted that in FIGS. 7B and 9B only every second of TBS indices between 0 and 9 can form a combination with MCS. This has been agreed in 3GPP in order to maintain 5-bit long signaling of MCS in the DCI also for the MCS table with 256 QAM modulation. This example is not to limit the present disclosure, which is applicable irrespectively of the length of the MCS.

The benefit of this additional modulation order selection flexibility is that it is possible to transmit certain transport block sizes in short or very short subframes, which would otherwise not be possible without such a modulation order adaptation.

This approach may be implemented in downlink. Accordingly, the UE knows that in certain cases the modulation order is not the one indicated by the MCS but a higher one. The transmitter (base station) evaluates whether or not transport block fits into a particular subframe (partial subframe) when using the modulation order indicated by MCS in accordance with the release 12 specification. If the transport block does not fit, higher modulation order is used. As can be seen in FIG. 9A, for a TBS index value of 13, modulation scheme 16 QAM is currently defined in the release 12 specification. In addition thereto, for mapping the transport block into a partial subframe rather than into a complete subframe, a higher order modulation is applicable in accordance with the present disclosure (cf. 64 QAM according to FIG. 9A). Correspondingly, FIG. 9B shows the corresponding extended mapping of transport block size indices to modulation order for LTE partial subframes with modulation scheme 256 QAM enabled.

Figure 10A:
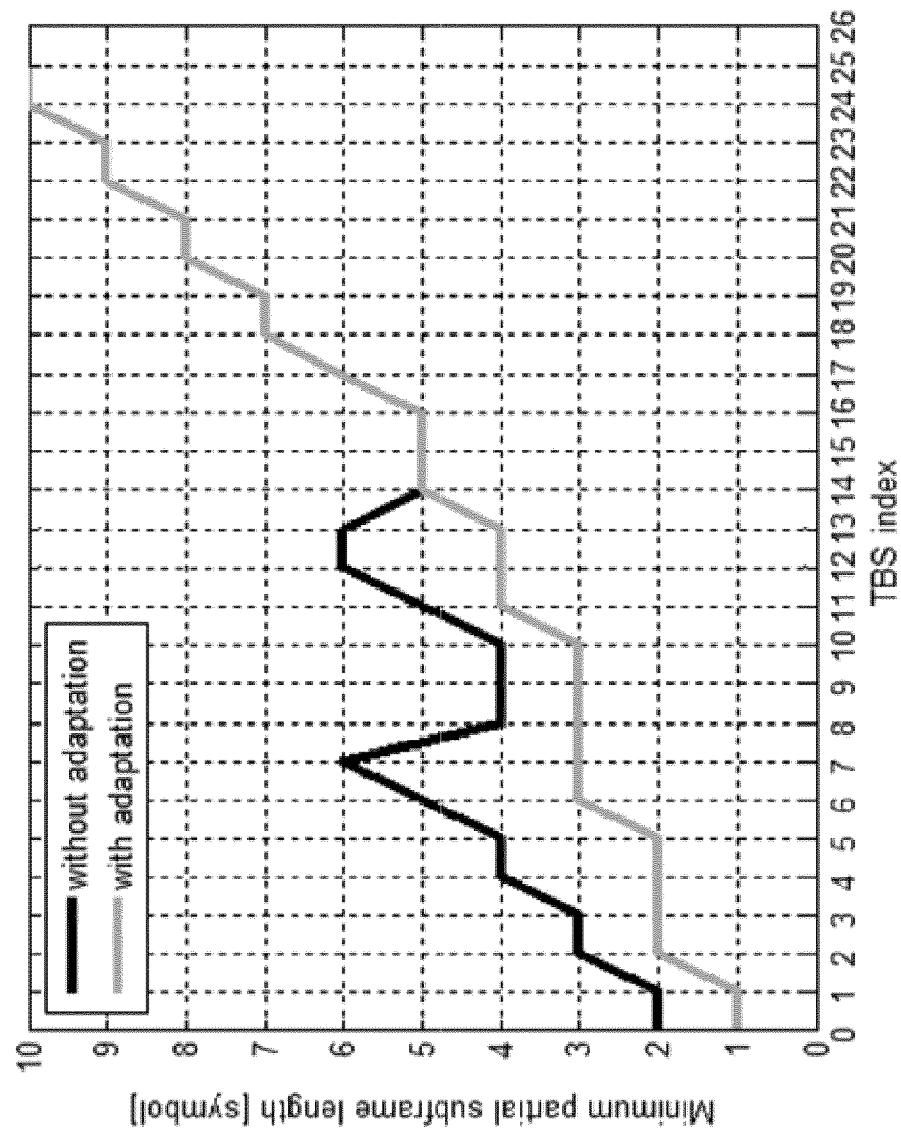
FIG. 10A is a graph showing minimum partial subframe length depending on the TBS index with and without modulation order adaption.
Figure 10B:
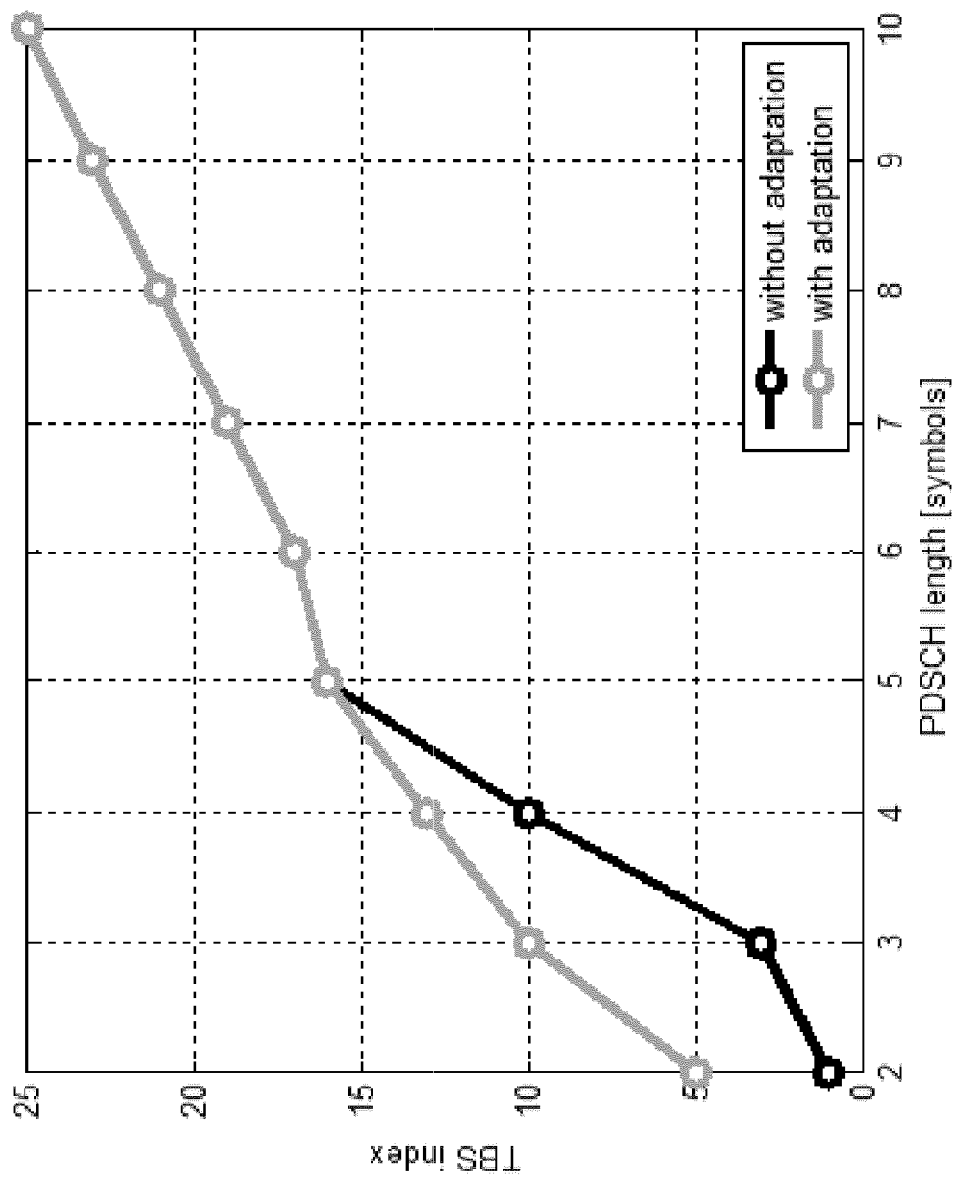
FIG. 10B is a graph showing TBS depending on the PDSCH length in symbols with and without modulation order adaption.

The impact of modulation order adaptation on minimum possible partial subframe (and hence PDSCH) length and maximum possible TBS index depending on partial subframe length is shown in FIGS. 10A and 10B. These calculations have been performed for a UE that does not support 256 QAM (corresponding to FIG. 10A) under the assumption of allocating 100 PRBs and 12×100 REs per OFDM symbol in the partial subframe. It can be seen that especially short and very short partial subframes will benefit from the modulation order adaptation in terms of allowing the transmission on larger transport blocks.

The basic concept applied to the LTE operation in unlicensed bands can be thus summarized as having an initial modulation order that is given by the MCS index within the DCI and an additional optional modulation order adaptation. The support of modulation order adaptation would be configured semi-statically by means of higher-layer signaling. This means that a higher-layer control signaling would configure whether or not the modulation adaption of the present disclosure is enabled or disabled.

In addition to the possibility of increasing the modulation order with respect to the initial modulation order by one level (QPSK to 16 QAM, 16 QAM to 64 QAM, and 64 QAM to 256 QAM), it can furthermore be beneficial to support modulation order adaptations of more than one step; such as for example allowing to switch from QPSK to 16 QAM and to 64 QAM as well. In this case, the corresponding higher-layer configuration would comprise the information regarding the supported adaptation steps.

It is noted that the modulation adaption does not exclude the possibility of also adapting the size of the transport block additionally or as an alternative. In particular, according to an embodiment, the transport block size reduction is tried first and only if the reduction of transport block size is not possible, modulation order is increased. Accordingly, the method further includes the steps of determining the size of the partial subframe; evaluating whether the generated transport block reduced by puncturing or removing a predetermined maximum of bits fits into the partial subframe with the determined size; transmitting, with the predetermined modulation, the generated transport block reduced by puncturing or removing some bits to fit the size of the partial subframe if the reduced transport block fits into the partial subframe; and transmitting the generated transport block with the modified modulation different from the predetermined modulation otherwise.

Puncturing and removing bits are both means for rate adaption, and in particular for reducing the redundancy of the coded data. The removed number of bits should lead to a code rate equal to or lower than 1 in order to be able to at least transmit the uncoded bits (code rate equal to 1). However, the maximum of bits punctured/removed should be lower in order to benefit from coding at all. For instance, as mentioned above, in LTE, a predefined threshold of code rate must not be exceeded. Such threshold may be in general configurable. Puncturing means that non-consecutive bits are taken from the coded block. However, the present disclosure also envisages removing a block of consecutive bits. The suitability of bits to be taken out depends on the particular coding. A coding which also implements an interleaver may also provide good results in term of error probability after decoding if consecutive bits are removed. For other codes, puncturing may be better.

Figure 9C:
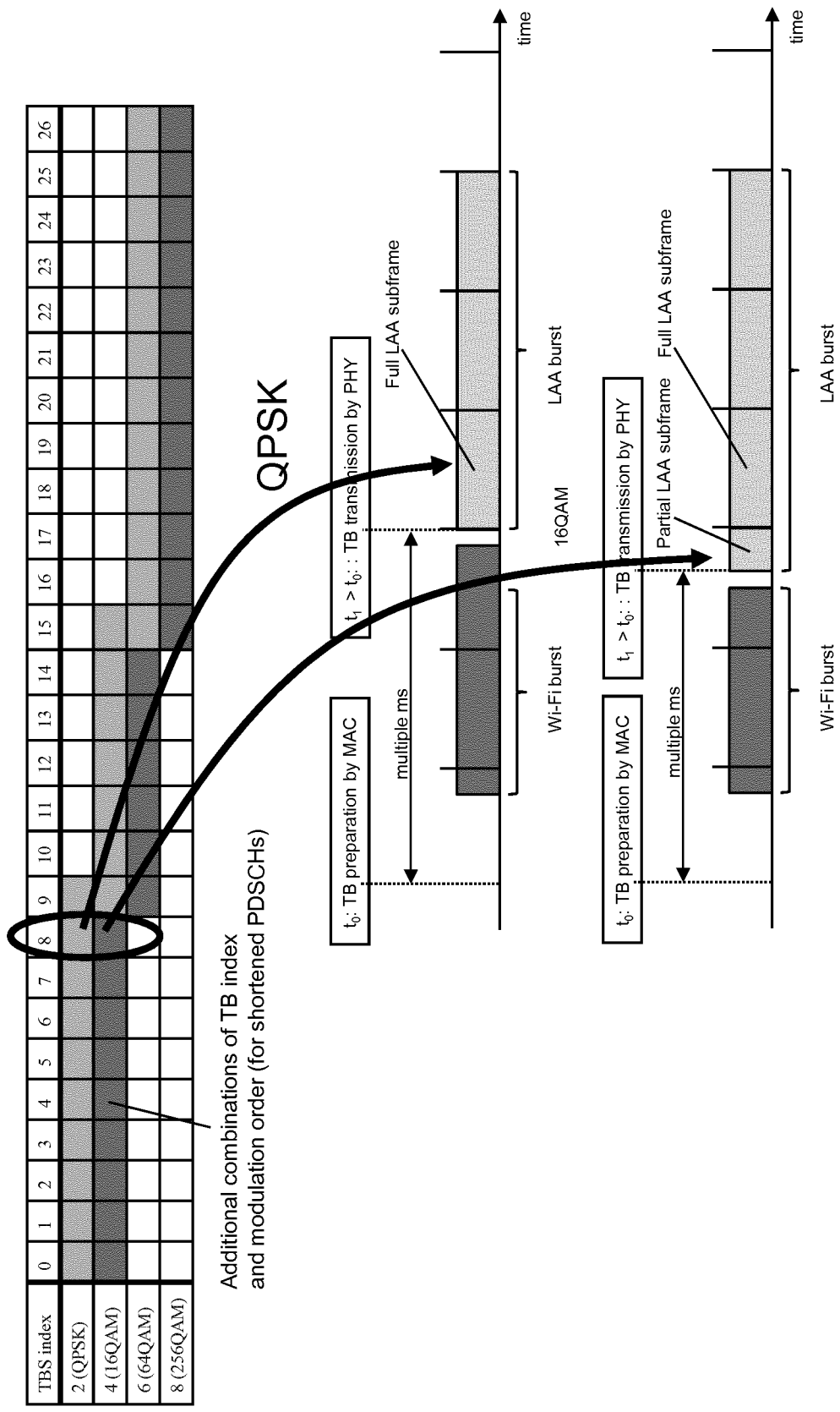
FIG. 9C is a schematic drawing illustrating modulation order adaption.

This approach is illustrated in FIG. 9C in which the UE received a DCI with an MCS value indicating transport block size with index eight and modulation scheme QPSK. This modulation is used if the entire subframe is available. In such case, low code rate is applied due to a large number of resource elements available. On the other hand, if only a partial subframe is available at the beginning of the LAA downlink burst, a high code rate would be the result. If the code rate is higher than a threshold, transmission is not possible anymore. According to the present disclosure, the modulation order is therefore adapted and the modulation scheme applied is 16 QAM.

In the following, various embodiments are described which provide different options for indicating the modulation order adaptation to the UE for which the PDSCH is scheduled.

If the modulation order encompasses only switching to the next higher modulation order, one bit for indication is sufficient.

If more than one step of adaptation is to be supported, more bits are required. For instance, two bits are sufficient for supporting full flexibility in terms of modulation order adaptation covering QPSK, 16 QAM, 64 QAM and 256 QAM which are currently used in LTE. These two bits may be used for indicating absolute modulation orders independent of the initial modulation order as shown in Table 4. Another possible implementation that makes use of relative adaptations of the modulation order is shown in Table 5.

TABLE 4

Bit field value interpretation for modulation order adaptation - Option A

| Bit field value | New modulation order |
| --- | --- |
| 00 | 2 |
| 01 | 4 |
| 10 | 6 |
| 11 | 8 |

TABLE 5

Bit field value interpretation for modulation order adaptation - Option A

| Bit field value | New modulation order (initial modulation order 2) | New modulation order (initial modulation order 4) | New modulation order (initial modulation order 6) | New modulation order (initial modulation order 8) |
| --- | --- | --- | --- | --- |
| 00 | 2 | 4 | 6 | 8 |
| 01 | 4 | 6 | 8 | 2 |
| 10 | 6 | 8 | 2 | 4 |
| 11 | 8 | 2 | 4 | 6 |

Embodiment A

According to this embodiment, the modulation order adaptation is indicated within the downlink control information (DCI) that is used for indicating a PDSCH allocation within a shortened PDSCH to the UE.

One approach for indicating the modulation order adaptation within the DCI can be achieved by extending the DCI format length by one bit per allocated transport block which indicates whether the modulation order for the transport block has been increased compared to the initial modulation order given by the MCS index signaled for that transport block. An exemplary implementation is shown in Table 3.

TABLE 3

Bit value interpretation for modulation order adaptation

| Bit value | New modulation order |
| --- | --- |
| 0 | Keep initial modulation order |
| 1 | Increase modulation order by one step compared to initial modulation order |

In summary, the method for transmitting transport blocks in partial subframes with modulation adaption may further include the step of receiving a modulation adaptation indicator indicating whether or not modulation order modification is performed, wherein the transport block is transmitted with the modified modulation only if the modulation adaptation indication indicates that modulation order modification is performed. The receiving node operating in the unlicensed band may use then the modified modulation order for demodulation of the transmitted transport block if the modulation adaptation has been indicated. The modification of the modulation is an advantageous modification of modulation order that has the benefit of efficient signaling. Moreover, a system such as LTE may use, for the purpose of link adaption, also modulation order variation in which the present disclosure may be readily incorporated. It is also noted that since constellation of QPSK and 4 QAM are same, in this disclosure, QPSK is handled as a QAM modulation. Thus, a modification of QPSK to 16 QAM is here considered as mere modulation order modification. It is further noted that the modulations exemplified above can be extended to include further orders such as order one (BPSK—binary phase shift keying) or orders higher than eight.

Moreover, the modulation adaptation indicator is advantageously signaled within the downlink control information. The DCI belongs to dynamic signaling.

Following are non-limiting examples of the modulation adaption indicator:

The modulation adaptation indicator may be one bit long and indicates that modulation modification is performed on transmitter side, the modified modulation is a modulation with order higher than the predetermined modulation. This kind of signaling is efficient since it merely requires one bit. However, the flexibility of modulation adaption is limited to merely increase modulation order by one step, such as for example from 2 (QPSK) to 4 (16 QAM) or from 4 (16 QAM) to 6 (64 QAM).

Alternatively, the modulation adaptation indicator indicates the (absolute) order of the modified modulation. This approach may be beneficial as it provides greater flexibility of modulation adaption.

The modulation adaption indicator may indicate the order of the modified modulation depending on the predetermined modulation. Thus, the value of the signaled modulation adaption indicator is to be interpreted with respect to the predetermined modulation as exemplified in Table 5. In other words, the order of the modified modulation is determined based on the signaled modulation adaption indicator and the order of the predetermined modulation.

The modulation adaption indication may be incorporated into the DCI as a new field (for instance, available starting from a particular release of standard). Another approach could be to reuse certain bits or code points of existing DCI formats. Various examples are described in the following.

The DCI formats 2, 2A, 2B, 2C and 2D that are used for transmissions of up to two transport blocks within an PRB allocation support switching between two different allocation types (Type 0 and Type 1). These allocation types correspond to addressing a resource block groups (RBGs) by a bitmap and addressing individual PRBs within a subset of RBGs, respectively. A detailed description of the allocation types can be found in Section 7.1.6 of TS 36.213 cited above. The communality of the DCI formats is shown in FIG. 11. As can be seen from FIG. 11, the DCI includes the resource allocation header (indicating allocation type) followed by resource block allocation which specifies the PRBs granted for transmission or reception. The HARQ process number is then followed by information per transport block. Since it can be assumed that the unlicensed band operation of LTE will focus on wideband allocations, it is not required to distinguish between two different allocation types. The resource allocation header bit in the DCI formats 2, 2A, 2B, 2C and 2D can therefore be reinterpreted as indicating a modulation order adaptation compared to the initial modulation order given by the MCS index for both transport blocks. The indicated modulation order adaptation can be applied just for one of the transport blocks or for both. A typical implementation could be that a bit value of 0 would indicate the use of the initial modulation order that is given by the MCS values, and a bit value of 1 could indicate an modulation order adaptation compared to the initial modulation order, such as for example switching from QPSK to 16 QAM, from 16 QAM to 64 QAM, and from 64 QAM to 256 QAM.

In other words, the downlink control information carries the modulation adaption indicator in the position of an allocation type distinguisher (resource allocation header) which is not signaled. Thus, the resource allocation header field in the DCI is reinterpreted as the modulation adaption indication, wherein it is assumed that the resource allocation header has a particular predefined value.

One specific solution for LTE operation in unlicensed bands could be that partial subframes support only single transport block transmissions. That would mean that it is not required to distinguish between two transport blocks regarding the question for which transport block the modulation order adaptation has to be applied. It can be further possible to configure by means of higher-layer signaling whether this modulation order adaptation is applied for both transport blocks or just for one of the transport blocks. In other words, according to an exemplary embodiment, partial subframes carry at most one transport block and the downlink control information also merely indicates transmission parameters for a single transport block.

The same approach can be applied for single transport block transmissions with DCI formats 1, 1A, 1B and 1D where the resource allocation header bit distinguishes either between Type 0 and Type 1 or between Type 2 allocation (consecutive set of PRBs) with localized and distributed virtual resource bocks (VRBs). The first applies for DCI format 1 while the latter applies for DCI format 1A, 1B and 1D. The corresponding communality of the DCI formats is shown in FIG. 12.

PDSCH transmissions that are indicated by DCI format 1C do not require modulation order adaptation since it is only used for the transmission of small transport block for the purpose of transmitting random access response messages, system information and paging messages as described in Section 7.1 of TS 36.213 [3]. It is expected that these messages will not be transmitted in a partial subframe of an LAA downlink burst or not in unlicensed bands at all.

Another approach for indicated modulation order adaptation could be using a certain RV (redundancy version) value. A certain redundancy version code point, such as for example RV=01 could be reserved for transmissions with an adapted modulation order compared to the one given by the MCS index. A redundancy version of a transport block specifies a starting point in the circular buffer that stores the encoded transport block on transmitter side. LTE supports four redundancy versions, each constituting a different representation of the encoded transport block, in other words—another pointer within the circular buffer. The transmitter can select the redundancy version for initial transmissions and retransmissions of a transport block. It is not required to make use of all redundancy versions. Reserving a certain redundancy version for transmissions with modulation order adaptation has therefore in general limited impact on the transmissions without modulation order adaptation that are restricted to reduced set of redundancy versions, such as for example three instead of four. In addition to reserving only a single RV for modulation order adaptation, it is also possible to reserve two RVs for transmissions with modulation order adaptation and keep two RVs for transmissions without modulation order adaptation.

In case of Transmission Mode 10, which makes use of DCI format 2D, it is also possible to use the PDSCH RE Mapping and Quasi-Co-Location Indicator field for indicating a modulation order adaptation for the PDSCH. That indicator can take one out of four values, where each value indicates a certain given combination of transmission parameters related to the PDSCH allocation. These parameters comprise information related to the configuration of CRS, MBSFN subframes, CSI-RS pattern, PDSCH starting position, and antenna port quasi co-location. The definition of antenna port quasi co-location in LTE is given in Section 7.1.10 of 3GPP TS 36.213, cited above. The parameter setting of each combination is configured by higher-layer signaling.

The configuration parameter set for the interpretation of the bit field as described in Section 7.1.9 of the 3GPP TS 36.213 could be extended by an additional configuration parameter indicating whether a modulation order adaptation is applied or not.

In case of Transmission Mode 9 and Transmission Mode 10, which make use of DCI format 2C and 2D, respectively, it is furthermore possible to use the bit field for indicating antenna port(s), scrambling identity and number of layers. The interpretation of the bit field as described in Table 5.3.3.1.5C-1 of the 3GPP TS 36.212, v12.5.0, June 2015, titled "Evolved Universal Terrestrial Radio Access (E-UTRA); Multiplexing and channel coding" and available at www.3gpp.org, could be extended by an indication of modulation order adaptation.

Embodiment B

According to this embodiment, the modulation adaption indication is semi-statically configured. In particular, it is signaled for which combinations of transport block sizes (or transport block size indices) and partial subframe length the modulation order adaptation will be applied.

In contrast to Embodiment A, the DCI format changes or the reinterpretation of certain bits within DCIs, are not required. According to embodiment B, the LTE/LTE-Advanced specification may be extended by one or multiple tables that define for which TBS indices and PDSCH length (or partial subframe length), an adaptation of the modulation order is applied with respect to the initial modulation order indicated by the MCS field in the DCI.

An exemplary table for that purpose is shown in FIG. 13. It contains for each TBS index the PDSCH length margin (in number of OFDM symbols) for modulation order adaptation for the MSC configuration without 256 QAM according to the supported TBS indices in FIG. 7A. A corresponding table can be designed for the MCS configuration with 256 QAM according to the supported TBS indices in FIG. 7B. If the PDSCH is shorter than or equals the number of symbols given in the table, the modulation order will be adapted for the given TBS. It is noted that in case the predetermined modulation (calculated for generating the transport block) is already the modulation with highest order among modulations, according to an exemplary handling, the modulation adaption does not take place. Then, no transport block is transmitted in such partial subframe. However, this is only an exemplary handling. Other handlings may also be applied, such as mapping the transport block on a combination of the partial and an adjacent subframe or the like.

The table in FIG. 13 applies for allocations of 100 PRBs and has been derived from the calculation results shown in FIGS. 10A and 10B. It has to be kept in mind that the figures were obtained under the assumption that 12×100 REs per OFDM symbol are used for the PDSCH allocation. Different assumptions in terms of number of REs per OFDM symbols (for example due to inclusion of various reference signals such as different CRS, CSI-RS and/or DM-RS assumptions) can yield diverging results for the PDSCH length margin.

The number of symbols which define the length of the partial subframe may be referred to as length margin. In particular, for transport block size with index 11, modulation adaption takes place if the partial subframes has a length shorter than or equal to 4. For transport block sizes with indices larger than 13, no adaption of modulation order is applied (represented by "x" in the table). Modulation adaptation for index 14 does not show gains under the calculation assumptions described above. It can however be beneficial to support modulation adaptation for index 14 as well in case of differing calculation assumptions. The table shown in FIG. 13 is just an exemplary implementation following certain specific assumptions.

The PDSCH length margins can differ depending on assumptions regarding the number of allocated PRBs. It can therefore be reasonable to define multiple tables for different number of PRBs or PRB allocation ranges. In other words, the present disclosure is not limited to the table and in particular not to the merely exemplary values shown in FIG. 13. In accordance with this embodiment, one or more tables may be signaled semi-statically. Alternatively or in addition, rather than signaling the entire tables, the tables may be defined within the specifications of the standard and merely a table number can be signaled.

As a further alternative, the tables as shown in FIG. 13 may be specified in the standard and applied. In addition, the modulation adaption indicator may be signaled semi-statically and indicate whether or not the other option is to take place in accordance with the tables defined in standard.

In general, according to this embodiment, the modulation adaptation indicator is signaled semi-statically by a radio resource control protocol of a layer higher than a physical layer, and indicates combinations of transport block sizes and partial subframe lengths for which the modulation modification is to be performed.

Embodiment C

In accordance with Embodiment C, the modulation order adaptation is applied when the code rate with the initial modulation order that is indicated by the MCS field within the DCI exceeds a certain defined code rate threshold. A reasonable value for the code rate threshold could for example be 0.931 following the current specification in terms of supported code rates as given in Section 7.1.7 of TS 36.213 cited above. However, it is noted that this threshold value is only exemplary and a different value can be predefined. Alternatively, this threshold may be configurable for instance by semi-static signaling or the like.

Adaptations or enhancements of DCI formats are not required in case of Embodiment C.

The receiver knows the length of the partial subframe as well as the MCS including TBS scheduled. The determination of the partial subframe length can be achieved either by explicit signaling of the length from transmitter side or by detection of the partial subframe start on the receiver side. One possibility to detect the partial subframe start is the transmission of a reservation signal with a known signature prior to the partial subframe start. If the receiver is a UE, it has received a DCI with the MCS including TBS. If the receiver is an eNB then it scheduled the transmission and so also knows the predetermined TBS and modulation order.

Embodiment D

It is noted that the present disclosure is not limited to explicitly signaling the modulation adaption indication. Rather, according to an embodiment, the method as described above may include at the transmitter a decision unit for deciding whether modulation order should be modified or not and modifying the modulation accordingly. This does not necessarily have to be signaled to the receiver.

In particular, the method may further include, at the receiver, the step of blind decoding of the transport block to be received in the partial subframe to determine the modulation order. In other words, the receiver attempts decoding by applying the demodulation with possible modulation orders.

Accordingly, in accordance with Embodiment D, the modulation order adaptation is not explicitly indicated to the UE by means of PHY or higher layer signaling. It has to be determined by means of blind detection whether the initial modulation order indicated by the MCS field within the DCI is used, or whether this modulation order has been changed.

Adaptations or enhancements of DCI formats are not required in case of Embodiment D and the blind detection of the modulation order corresponds to the interference cancellation related procedures described in 3GPP TR 36.866, v12.0.1, March 2014, titled "Study on Network-Assisted Interference Cancellation and Suppression (NAIC) for LTE" and available under www.3gpp.org.

It is noted that the above embodiments are merely exemplary. According to the present disclosure, a predetermined modulation for a partial subframe signaled by the scheduling entity may be adapted in order to fit transport block into a partial subframe of which the length becomes known after the transport block to be carried in such partial subframe has already been formed. Even though the above embodiments addressed a partial subframe located at the beginning of the LAA burst, the present disclosure is not limited to such configuration. Rather, the partial subframe may also be located at the end of the LAA burst or at both the start and the end of the LAA burst.

Moreover, instead of mapping a transport block to a partial subframe, the transport block may be mapped to a conjunction of the partial subframe and an immediately adjacent complete subframe. In particular, according to one example, after sensing, a partial frame starts within a subframe followed by further complete subframes reserved for transmission of the wireless communication system and not exceeding a predefined duration are transmitted.

According to another example, after sensing, a number of subframes followed by the partial subframe reserved for transmission of the wireless communication system and not exceeding a predefined duration are transmitted.

Irrespectively of the location of the partial subframe, according to an embodiment the modified modulation is applied to the partial subframe as well as to a subframe adjacent to the partial subframe, and one transport block is mapped onto a combination of the partial subframe and the adjacent subframe, and the modified modulation has a lower order than the predetermined modulation.

In this embodiment, the partial subframes are not used for transmitting the data as separate subframes but rather attached to an adjacent complete subframe. The additional resource elements available by using the partial subframes may be utilized for transmission of the transport block with a more robust modulation, such as modulation with a lower order. Alternatively or in addition, the code rate may be adapted, i.e., decreased.

In general, the transmitter, applies modulation adaption according to a configuration received (when implemented at UE) and/or according to a predetermined condition (for instance on maximum code rate).

The receiver recognizes the correct modulation either according to the modulation adaption indicator received and indicating whether the modification was performed or by blind decoding with modulations of different order.

FIG. 14A illustrates an example of the above described methods to be performed at the scheduling entity (base station, BS) and the wireless device (user equipment, UE) for transmission and reception of transport blocks in the uplink direction. It is noted that in general the scheduling entity may also be another user equipment performing the scheduling function. This may be implemented for instance in a system working in ad hoc or device-to-device mode.

In particular, a method is provided for transmitting transport blocks within a wireless communication system, the method to be performed on the user equipment (cf. right-hand side of FIG. 14A). The method comprises the following steps: receiving 1420 (from the scheduling entity) a downlink control information including a resource grant comprising a predetermined modulation and a predetermined transport block size information, generating 1421 a transport block including channel coded data to be transmitted in a subframe with the predetermined modulation and the predetermined transport block size, performing sensing 1422 in the subframes and determining whether a partial subframe or a complete subframe is available for transmission of the generated transport block and transmitting 1426 the transport block with a modified modulation different from the predetermined modulation if the partial rather than complete subframe is available.

As can be seen in FIG. 14A, the modification of the modulation 1425 does not have to take always place. In particular, the sensing 1422 which may be implemented as a listen before talk procedure reveals whether the granted resources are available or not. This may be achieved by measuring the power and by deciding that the resources are available if the measured power is lower down is a certain threshold and deciding that the resources are not available otherwise. Indecision block 1423 if the resources are not available for transmission, the transport block is not transmitted. If on the other hand some resources are available in block 1424 it is judged whether a modulation adaption is necessary. This decision is performed on the basis of the length of the (partial) subframe available for the transmission. If a complete subframe is available, no adaption of modulation is necessary, and the transport block is transmitted 1426 in the complete subframe. If on the other hand, only a partial subframe is available, adaption of modulation 1425 may be necessary.

The necessity of other may be judged in various ways. For instance, there may be a threshold for a code rate. If the code rate resulting from applying the modulation and coding scheme (with some rate matching) is larger than the threshold, then the modulation is adapted 1425, for instance by increasing the order of the modulation. This threshold may be different (lower) from a maximum code rate threshold defined in a standard. It may be configurable. However, the present disclosure is not limited thereto and the same threshold as specified in standard may be used. It is noted that this criterion of necessity to modify the modulation should not limit the scope of the present disclosure. There may be another mechanism for deciding such as a defined table with possible lengths of the partial subframe, modulation scheme and transport block size defining dependent on these three parameters or their subset whether or not modification of modulation 1425 should be performed. Further revelations are possible.

It is also noted that the predetermined modulation and the predetermined transport block size information may be signaled by means of modulation and coding scheme index as specified in LTE/LTE-A.

Figure 14B:
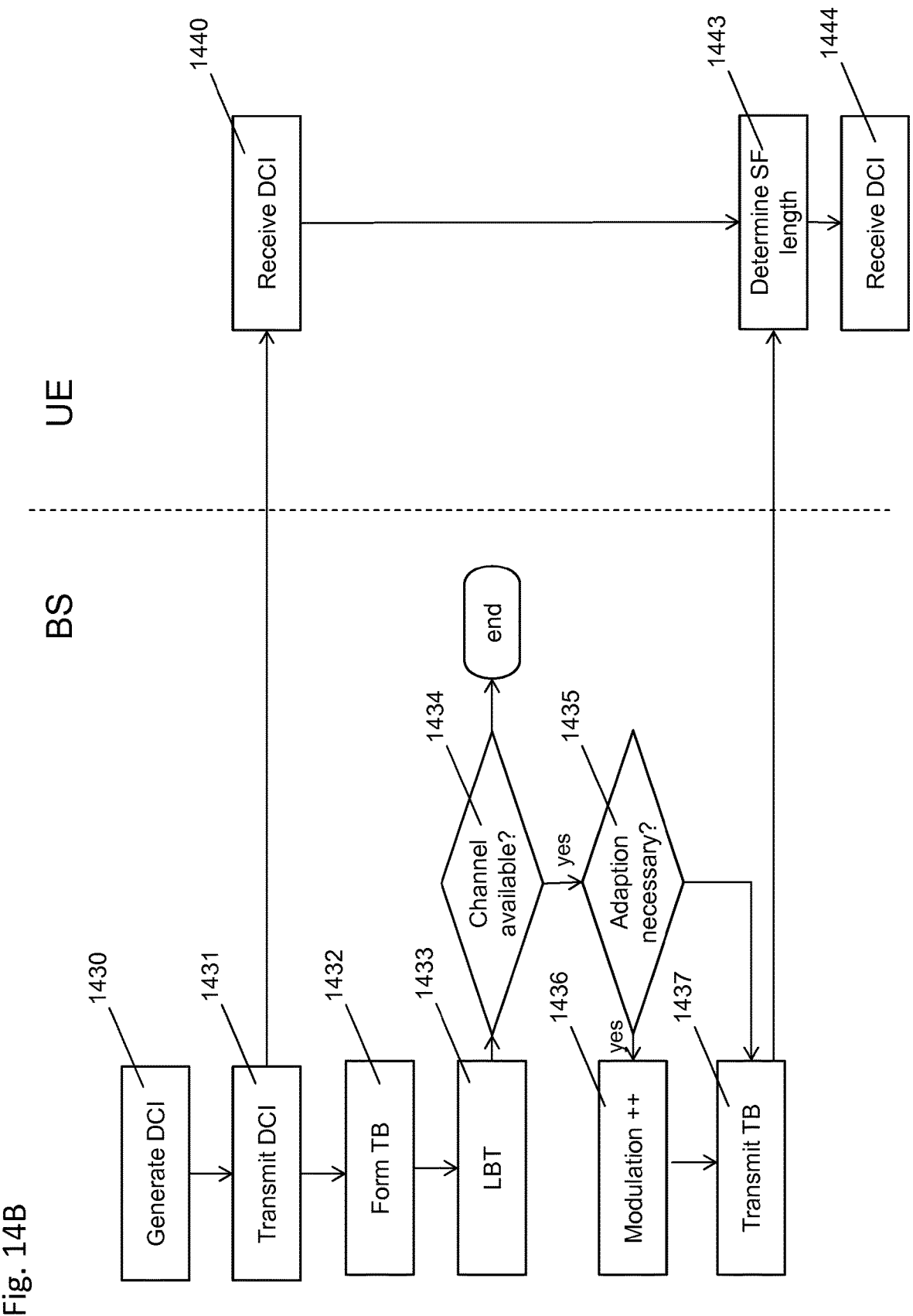
FIG. 14B is a flow diagram illustrating a method of an embodiment according to the present disclosure for transmission and reception in downlink.

A similar transmission method as described above for the UE may also be performed at the scheduling entity. This is illustrated in FIG. 14B on the left-hand side. In particular, a method for transmitting transport blocks in subframes of a predefined length within a wireless communication system. The method includes the following steps: generating 1430 a downlink control information including a resource grant comprising a predetermined modulation and a predetermined transport block size, generating 1432 a transport block including channel coded data to be transmitted in a subframe with the predetermined modulation and the predetermined transport block size, performing 1433 sensing in the subframes and determining whether a partial subframe or a complete subframe is available for transmission of the generated transport block and transmitting 1437 the transport block with a modified 1436 modulation different from the predetermined modulation if the partial rather than complete subframe is available.

It is noted that the generated DCI is transmitted 1431 to the scheduled entity (UE) and that it includes the grant for reception of data from the scheduling entity (base station) that are transmitted in step 1437. It is further noted that the DCI translation in a system similar to LTE may be performed within the same subframe as the transmission of downlink data and thus after performing the sensing 1433. This corresponds to the configuration according to which the DCI is transmitted in the PDCCH which is located in the first OFDM symbols followed by the data regions in which the scheduled data may be transmitted.

As also already described for the transmitting method implemented in the scheduled entity, after the sensing it is judged 1434 whether or not the scheduled resources are available and if the transport block is transmitted. If the resources are available, it is tested 1435 whether modulation adaption is necessary or not. This testing may be the same as described above for the uplink transmission. If modulation adaption is necessary, then it is performed 1436. Otherwise, the transport block is transmitted 1437 directly with the predetermined modulation scheme and transport block size possibly adapted by the rate matching such as puncturing or leaving out some bits.

The method (for uplink or downlink) may further comprise the steps of determining the size of the partial subframe; evaluating whether the generated transport block reduced by puncturing or removing a predetermined maximum of bits fits into the partial subframe with the determined size; transmitting, with the predetermined modulation, the generated transport block reduced by puncturing or removing some bits to fit the size of the partial subframe if the reduced transport block fits into the partial subframe; and transmitting the generated transport block with the modified modulation different from the predetermined modulation otherwise.

FIG. 14A further shows a method for receiving the transmitted transport blocks at the scheduling entity (base station). In particular, this method is a method for receiving transport blocks in subframes of a predefined length within a wireless communication system, including the following steps: generating 1410 a downlink control information including a resource grant comprising a predetermined modulation and a predetermined transport block size, determining 1414 whether a transport block including channel coded data to be received according to the grant is to be received in a partial subframe or a complete subframe, and receiving 1415 (and decoding) the transport block with a modified modulation different from the predetermined modulation if the transport block is received in the partial rather than the complete subframe. As can be seen in the figure, it may be also the step of transmitting 1411 the generated downlink control information to the scheduled entity (UE).

Correspondingly, FIG. 14B shows a method (on the right-hand side to be performed at the scheduled entity, UE, in downlink) for receiving transport blocks in subframes of a predefined length within a wireless communication system, including the following steps: receiving 1440 a downlink control information including a resource grant comprising a predetermined modulation and a predetermined transport block size, determining 1443 whether a transport block including channel coded data to be received according to the grant is to be received in a partial subframe or a complete subframe, and receiving 1444 (and decoding) the transport block with a modified modulation different from the predetermined modulation if the transport block is received in the partial rather than the complete subframe.

According to an embodiment, the method further includes receiving or generating a modulation adaptation indicator indicating performing or not performing modulation modification for partial subframes, wherein the transport block is modulated with the modified modulation only if the modulation adaption indication indicates performing modulation modification.

In particular, at the BS in uplink, the modulation adaption indicator may be generated by the BS to indicate to the UE configuration whether or not the modulation adaption is to be applied at all by the UE for the upcoming transmission(s). The UE upon reception of the indicator does not apply the modulation adaption if the modulation adaption indicator indicates so. Otherwise, the UE may decide whether the modulation modification is necessary and apply or not apply it accordingly. This indicator may be a configuration transmitted semi-statically, i.e., configured via RRC. However, it may also be signaled within DCI or in another way. Nevertheless, it is noted that the present disclosure can also work without such indicator, in which case the UE decides whether or not to perform the modulation adaption without control of the scheduling entity.

In another example, which may also be combined with the previous example, at the UE in uplink, the modulation adaption indicator (which may be a one-bit flag or an indicator with more values) may be generated and transmitted to the BS in the uplink indicating whether or not the modulation adaption has been modified for a particular transmission. However, this indication may also be omitted in an alternative example, according to which the BS tries to decode the received partial subframe by using a plurality of modulations blindly. This means that the BS demodulates and decodes the data with more than one modulations and tests by the error correction/detection code such as CRC whether an error occurred or whether the data could be decoded correctly with one of the modulations.

The BS in downlink may generate the modulation adaption indicator indicating whether or not the BS applied (performed) the modulation modification to a particular transmission. This indicator may be transmitted on the same carrier as the data. However, a more robust signaling of this parameter would be done on a licensed cell and in particular the PCell. The UE when receiving such indicator does not need to perform blind decoding using more modulations. This indicator may be transmitted on PDSCH, PDCCH or EPDCCH. However, the UE may also perform blind decoding.

Advantageously, the modulation adaptation indicator is signaled within the downlink control information. In one example, the modulation adaptation indicator is one bit long and indicates performing of modulation modification, the modified modulation is a modulation with higher order than the predetermined modulation.

In another example, the modulation adaptation indicator indicates the order of the modified modulation. For instance, each value of the indicator is associated with a different modulation order. However, it is noted that also different kinds of modulations rather than merely order may be signaled by the indicator values.

In yet another example, the modulation adaption indicator indicates the order of the modified modulation, the indicator value interpretation depending on the predetermined modulation.

According to an embodiment, the downlink control information is a downlink control information according to an LTE/LTE-A standard and carries the modulation adaption indicator: in the position of a resource allocation header which is not signaled, or as a predetermined value of a redundancy version field, or in DCI format 2D as part of the parameter set indicated by the Quasi-Co-Location indicator field, or in DCI format 2C and/or DCI format 2D linked to an antenna port scrambling identity. The "or" above may be exclusive, meaning that only one of the above signaling possibilities is defined to be used in the standard. However, the "or" may also be alternative and depending on the DCI format, the way of signaling may vary.

However, the present disclosure is not limited to signaling the modulation adaption indicator within the DCI. Alternatively (or in addition), the modulation adaptation indicator is signaled semi-statically by a radio resource control protocol of a layer higher than a physical layer, and indicates combinations of transport block sizes and partial subframe lengths for which the modulation modification is to be performed.

According to another non-exclusive embodiment, partial subframes are allowed to carry at most one transport block and the downlink control information also merely indicates configuration for a single transport block.

According to an embodiment after sensing, a partial frame starts within a subframe followed by further complete subframes reserved for transmission of the wireless communication system and not exceeding a predefined duration are transmitted. In other words, the partial subframe (if any) is located on the start of the LAA burst.

Alternatively (or in addition), after sensing, a number of subframes followed by the partial subframe reserved for transmission of the wireless communication system and not exceeding a predefined duration are transmitted.

Moreover, it may also be advantageous to combine a partial subframe with a neighboring complete subframe. Accordingly, for instance, the modified modulation is applied to the partial subframe as well as to a subframe adjacent to the partial subframe (either before or after the partial subframe in the time domain), and one transport block is mapped onto a combination of the partial subframe and the adjacent subframe, and the modified modulation has lower order than the predetermined modulation. The lowering of the modulation order is possible for the transport block since there is more space for its transmission than planed (based on the predetermined MCS).

The modification of modulation is an advantageous modification of the modulation order and the predetermined modulation as well as the modified modulation is one of BPSK, QPSK, 16 QAM, 64 QAM, and 256 QAM. These modulations are used for wireless transmissions.

Figure 15:
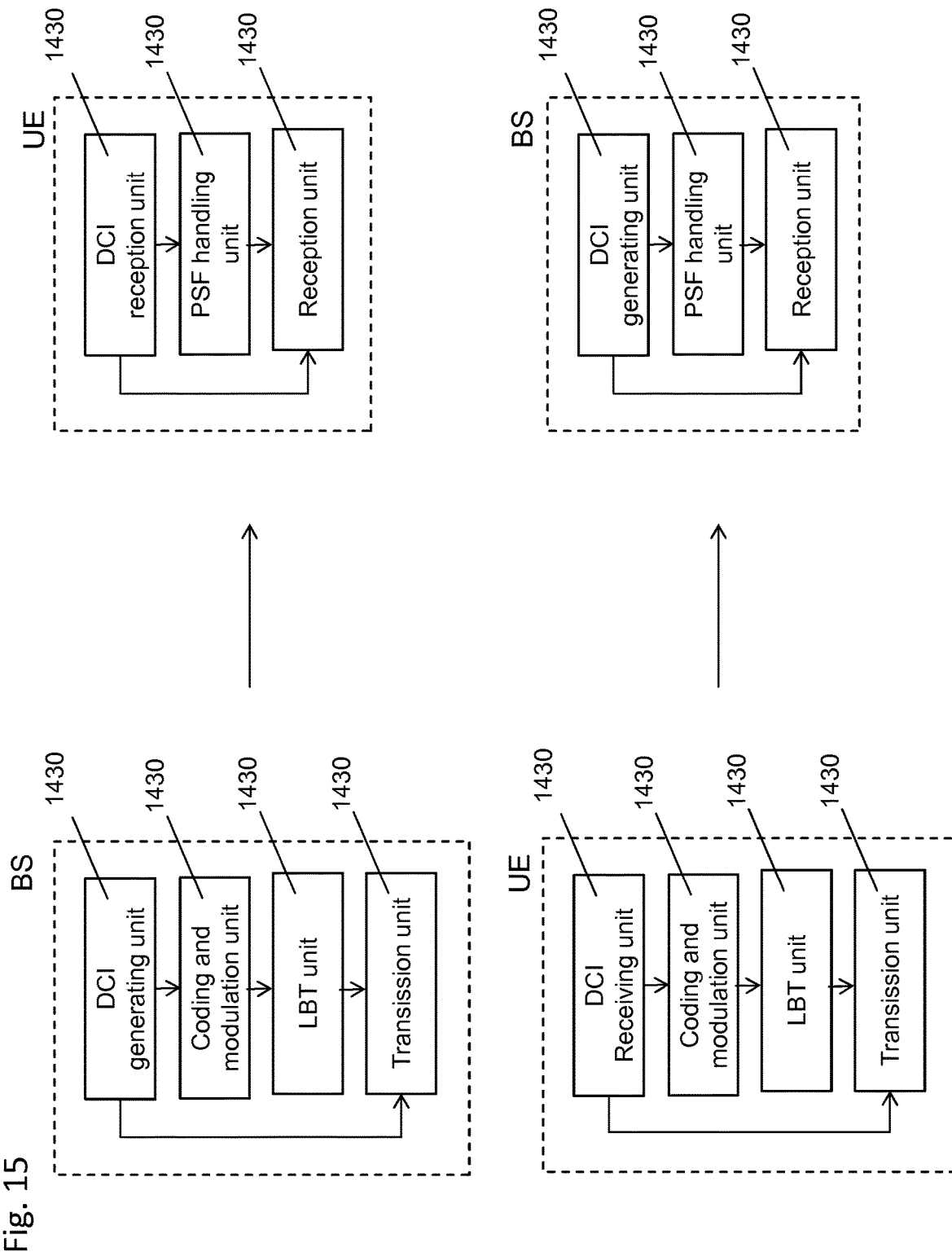
FIG. 15 is a block diagram illustrating an apparatus of an embodiment according to the present disclosure.

FIG. 15 illustrates exemplary devices according to the present disclosure. It is noted that FIG. 15 shows the transmission device and the receiving device for the UE (scheduled entity) as two separate entities. However, it is possible to have a UE which implements both the receiver and the transmitter according to the present disclosure. Similarly, FIG. 15 shows separated receiver and transmitter for the BS (eNB, scheduling entity). However, also the base station may implement both the receiver and the transmitter of the present disclosure.

FIG. 15 shows on the top left side an apparatus (scheduling entity, BS) for transmitting transport blocks in subframes of a predefined length within a wireless communication system, including: a control unit (which is here DCI generating unit) 1511 for generating a downlink control information including a resource grant comprising a predetermined modulation and a predetermined transport block size, a coding unit 1513 for generating a transport block including channel coded data to be transmitted in a subframe with the predetermined modulation and the predetermined transport block size, a carrier sensing unit 1515 for performing sensing in the subframes and determining whether a partial subframe or a complete subframe is available for transmission of the generated transport block; a transmission unit 1517 for transmitting the transport block with a modified modulation different from the predetermined modulation if the partial rather than complete subframe is available.

FIG. 15 shows on the bottom left side an apparatus (scheduled entity, UE) for transmitting transport blocks in subframes of a predefined length within a wireless communication system, including: a control unit 1521 for receiving a downlink control information including a resource grant comprising a predetermined modulation and a predetermined transport block size, a coding unit 1523 for generating a transport block including channel coded data to be transmitted in a subframe with the predetermined modulation and the predetermined transport block size, a carrier sensing unit 1525 for performing sensing in the subframes and determining whether a partial subframe or a complete subframe is available for transmission of the generated transport block; a transmission unit 1527 for transmitting the transport block with a modified modulation different from the predetermined modulation if the partial rather than complete subframe is available.

FIG. 15 shows on the top right side an apparatus (scheduled entity, UE) for receiving transport blocks in subframes of a predefined length within a wireless communication system, including: a control unit 1531 for receiving a downlink control information including a resource grant comprising a predetermined modulation and a predetermined transport block size, a partial subframe handling unit 1533 for determining whether a transport block including channel coded data to be received according to the grant is to be received in a partial subframe or a complete subframe, and a reception unit 1535 for receiving (and decoding) the transport block with a modified modulation different from the predetermined modulation if the transport block is received in the partial rather than the complete subframe.

FIG. 15 shows on the bottom right side an apparatus (scheduling entity, BS) for receiving transport blocks in subframes of a predefined length within a wireless communication system, including: a control unit 1541 for generating a downlink control information including a resource grant comprising a predetermined modulation and a predetermined transport block size, a partial subframe handling unit 1543 for determining whether a transport block including channel coded data to be received according to the grant is to be received in a partial subframe or a complete subframe, a reception unit 1545 for receiving and decoding the transport block with a modified modulation different from the predetermined modulation if the transport block is received in the partial rather than the complete subframe.

Hardware and Software Implementation of the Present Disclosure

Other exemplary embodiments relate to the implementation of the above described various embodiments using hardware, software, or software in cooperation with hardware. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices. In particular, each functional block used in the description of each embodiment described above can be realized by an LSI as an integrated circuit. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

In summary, the present disclosure relates to transmitting transport blocks in subframes of a predefined length within a wireless communication system. A downlink control information including a resource grant comprising a predetermined modulation and a predetermined transport block size is received (user equipment is the transmitter) or generated (base station is the transmitter). Then transport block including channel coded data to be transmitted in a subframe with the predetermined modulation and the predetermined transport block size is generated. Sensing is performed in the subframes and based thereon, it is determined whether a partial subframe or a complete subframe is available for transmission of the generated transport block. Finally, the transport block is transmitted with a modified modulation different from the predetermined modulation if the partial rather than complete subframe is available. Correspondingly, at the receiver, the grant is received (user equipment is receiver) or generated (base station is the receiver), the size of the subframe in which the reception is expected is determined and then the transport block is received with a modified modulation if only the partial subframe is available.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus comprising:
a transmitter, which, in operation, transmits, to a user equipment, downlink control information including an index indicating a first modulation order, a second modulation order, and a transport block size; and
control circuitry, which is coupled to the transmitter and which, in operation, uses the second modulation order for a first transport block to be transmitted in a partial subframe, wherein the second modulation order is higher than the first modulation order which is used for a second transport block to be transmitted in a complete subframe of a defined length; wherein
the transmitter, in operation, transmits the first transport block in the partial subframe to the user equipment.

2. The apparatus according to claim 1, wherein the transmitter, in operation, transmits a modulation adaptation indicator indicating performing or not performing modulation modification for partial subframes, wherein
the first transport block is modulated with the second modulation order only if the modulation adaption indication indicates performing modulation modification.

3. The apparatus according to claim 2, wherein the modulation adaptation indicator is signaled within the downlink control information and wherein:
the modulation adaptation indicator is one bit long and indicates performing of modulation modification,
the modulation adaptation indicator indicates the second modulation order, or
the modulation adaption indicator indicates the second modulation order depending on the first modulation order.

4. The apparatus according to claim 2, wherein the downlink control information is a downlink control information according to an LTE/LTE-A standard and carries the modulation adaption indicator:

in the position of a resource allocation header which is not signaled, or as a defined value of a redundancy version field, or in DCI format 2D as part of the parameter set indicated by the Quasi-Co-Location indicator field, or in DCI format 2C and/or DCI format 2D linked to an antenna port scrambling identity.

5. The apparatus according to claim 2, wherein the modulation adaptation indicator is signaled semi-statically by a radio resource control protocol of a layer higher than a physical layer, and indicates combinations of transport block sizes and partial subframe lengths for which the modulation modification is to be performed.

6. The apparatus according to claim 1, wherein partial subframes are allowed to carry at most one transport block and the downlink control information indicates configuration for a single transport block.

7. The apparatus according to claim 1, wherein the first modulation order and the second modulation order are selected from 2 (QPSK), 4 (16QAM), 6 (64QAM), and 8 (256QAM) modulation orders.

8. The apparatus according to claim 1, wherein the apparatus is a base station.

9. A method comprising:

transmitting, from an apparatus to a user equipment, downlink control information including an index indicating a first modulation order, a second modulation order, and a transport block size, using, by the apparatus, the second modulation order for a first transport block to be transmitted in a partial subframe, wherein the second modulation order is higher than the first modulation order which is used for a second transport block to be transmitted in a complete subframe of a defined length, and transmitting, from the apparatus to the user equipment, the first transport block in the partial subframe.

10. The method according to claim 9, further comprising:

transmitting a modulation adaptation indicator indicating performing or not performing modulation modification for partial subframes, wherein the first transport block is modulated with the second modulation order only if the modulation adaption indication indicates performing modulation modification.

11. The method according to claim 10, wherein the modulation adaptation indicator is signaled within the downlink control information and wherein:

the modulation adaptation indicator is one bit long and indicates performing of modulation modification, the modulation adaptation indicator indicates the second modulation order, or the modulation adaption indicator indicates the second modulation order depending on the first modulation order.

12. The method according to claim 10, wherein the downlink control information is a downlink control information according to an LTE/LTE-A standard and carries the modulation adaption indicator:

in the position of a resource allocation header which is not signaled, or as a defined value of a redundancy version field, or in DCI format 2D as part of the parameter set indicated by the Quasi-Co-Location indicator field, or in DCI format 2C and/or DCI format 2D linked to an antenna port scrambling identity.

13. The method according to claim 10, wherein the modulation adaptation indicator is signaled semi-statically by a radio resource control protocol of a layer higher than a physical layer, and indicates combinations of transport block sizes and partial subframe lengths for which the modulation modification is to be performed.

14. The method according to claim 9, wherein partial subframes are allowed to carry at most one transport block and the downlink control information indicates configuration for a single transport block.

15. The method according to claim 9, wherein the first modulation order and the second modulation order are selected from 2 (QPSK), 4 (16QAM), 6 (64QAM), and 8 (256QAM) modulation orders.

16. The method according to claim 9, wherein the apparatus is a base station.

17. A user equipment comprising:

a receiver, which, in operation, receives, from a base station, downlink control information including an index indicating a first modulation order, a second modulation order, and a transport block size, and receives, from the base station, a transport block; and control circuitry, which is coupled to the receiver and which, in operation, determines whether the transport block is received in a partial subframe or in a complete subframe of a defined length, and uses the second modulation order for the transport block determined to be received in the partial subframe, wherein the second modulation order is higher than the first modulation order which is used for the transport block received in the complete subframe.

18. The user equipment according to claim 17, wherein the first modulation order and the second modulation order are selected from 2 (QPSK), 4 (16QAM), 6 (64QAM), and 8 (256QAM) modulation orders.

19. A method implemented by a user equipment comprising:

receiving, from a base station, downlink control information including an index indicating a first modulation order, a second modulation order, and a transport block size;

receiving a transport block from the base station and determining whether the transport block is received station in a partial subframe or in a complete subframe of a defined length, and using the second modulation order for the transport block determined to be received in the partial subframe, wherein the second modulation order is higher than the first modulation order which is used for the transport block received in the complete subframe.

20. The method according to claim 19, wherein the first modulation order and the second modulation order are selected from 2 (QPSK), 4 (16QAM), 6 (64QAM), and 8 (256QAM) modulation orders.

\* \* \* \* \*

UNITED STATES PATENT AND TRADEMARK OFFICE
CERTIFICATE OF CORRECTION

PATENT NO. : 11,063,688 B2
APPLICATION NO. : 16/661690
DATED : July 13, 2021
INVENTOR(S) : Michael Einhaus et al.

It is certified that error appears in the above-identified patent and that said Letters Patent is hereby corrected as shown below:

In the Claims

Column 36, Claim 19, Lines 51-52:
"received station in a partial subframe" should read: -- received in a partial subframe --.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*